(12) United States Patent
Iwata et al.

(10) Patent No.: US 6,204,945 B1
(45) Date of Patent: Mar. 20, 2001

(54) SIGNAL LIGHT OUTPUTTING APPARATUS AND OPTICAL TRANSMISSION SYSTEM HAVING SIGNAL LIGHT OUTPUTTING APPARATUS

(75) Inventors: Hiroyuki Iwata, Yokohama; Masuo Suyama, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/834,211

(22) Filed: Apr. 15, 1997

(30) Foreign Application Priority Data

Jul. 9, 1996 (JP) .................................................. 8-179616

(51) Int. Cl.[7] ...................................................... H04J 14/02
(52) U.S. Cl. ........................... 359/124; 359/110; 359/133; 359/134; 359/161; 359/187
(58) Field of Search ..................................... 359/110, 133, 359/134, 124, 161, 187

(56) References Cited

U.S. PATENT DOCUMENTS

| | | | | |
|---|---|---|---|---|
| 4,989,201 | * | 1/1991 | Glance ...................................... | 370/3 |
| 5,225,922 | * | 7/1993 | Chraplyvy et al. ................... | 359/124 |
| 5,387,992 | * | 2/1995 | Miyazaki et al. ..................... | 359/124 |
| 5,404,413 | * | 4/1995 | Delavaux et al. ...................... | 385/15 |
| 5,589,970 | * | 12/1996 | Lyu et al. .............................. | 359/133 |
| 5,615,290 | * | 3/1997 | Harasawa et al. ..................... | 385/24 |
| 5,663,823 | * | 9/1997 | Suzuki .................................. | 359/181 |
| 5,673,129 | * | 9/1997 | Mizrahi ................................. | 359/124 |
| 5,675,432 | * | 10/1997 | Kosaka ................................. | 359/341 |
| 5,701,188 | * | 12/1997 | Shigematsu et al. ................. | 359/161 |
| 5,717,510 | * | 2/1998 | Ishikawa et al. ..................... | 359/161 |
| 5,886,804 | * | 3/1999 | Onaka et al. ......................... | 359/161 |

FOREIGN PATENT DOCUMENTS

| | | | | |
|---|---|---|---|---|
| 5-327662 A | * | 5/1992 | (JP) ..................................... | 359/161 |
| 5-327662 | | 12/1993 | (JP) . | |

* cited by examiner

Primary Examiner—Leslie Pascal
Assistant Examiner—Hanh Phan
(74) Attorney, Agent, or Firm—Staas & Halsey LLP

(57) ABSTRACT

The invention provides a signal light outputting apparatus for use for optical communication by wavelength multiplex transmission and an optical transmission system with the same wherein control of powers and/or wavelengths of signal lights to be transmitted can be performed with certainty and the signal lights can be transmitted and received accurately while making transmission characteristics of the signal lights equal to each other. The signal light outputting apparatus includes a plurality of signal light outputting units each including a signal light source and an optical amplifier, an optical combiner for combining signal lights outputted from the signal light outputting units, a signal light power detector for extracting part of signal light combined by the optical combiner to detect powers of the signal light for individual wavelengths corresponding to the signal light wavelengths, and a signal light output control element for controlling signal light outputs of the corresponding optical amplifiers for amplification of the signal lights of the wavelengths in response to the powers of the signal lights of the individual wavelengths detected by the signal light power detector.

15 Claims, 21 Drawing Sheets

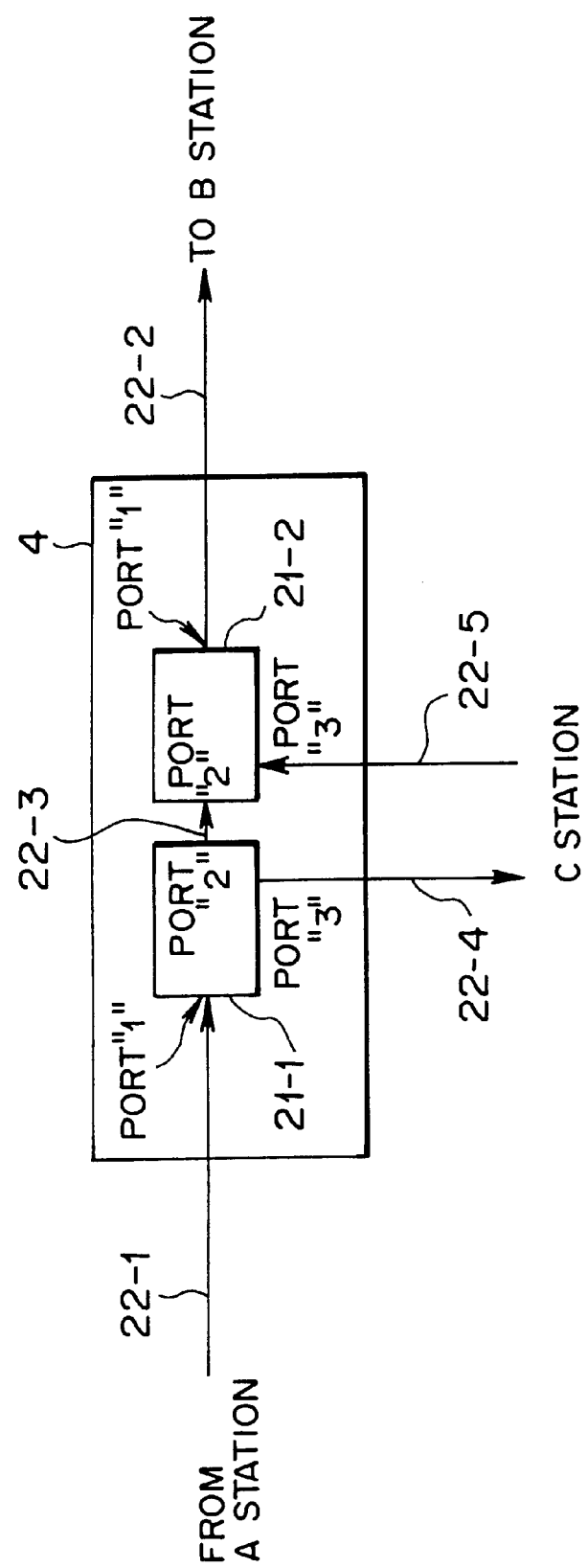

BEFORE TRANSMISSION

AFTER TRANSMISSION  ASE

BEFORE TRANSMISSION

MAKE OF ALL OPTICAL SNRS OF 4 CHANNELS EQUAL

AFTER TRANSMISSION

SIGNAL LIGHT OUTPUTTING APPARATUS AND OPTICAL TRANSMISSION SYSTEM HAVING SIGNAL LIGHT OUTPUTTING APPARATUS

BACKGROUND OF THE INVENTION

1. Field of the Invention

This invention relates to a signal light outputting apparatus suitable for use as a transmission apparatus for transmitting a plurality of signal lights of different wavelengths in an optical transmission system wherein optical communication is performed by wavelength multiplexing transmission, and also to an optical transmission system having a signal light outputting apparatus of the type mentioned.

2. Description of the Related Art

In order to allow communication of signal light between terminal stations spaced from each other, for example, with a sea interposed therebetween, an optical transmission system has been developed wherein an optical fiber cable is laid on the bottom of the sea and signal light is repeated and amplified in a plurality of stages using a plurality of optical amplifiers provided for the optical fiber cable.

An example of such an optical transmission system laid on the bottom of a sea as just described will be described with reference to FIG. 20.

Referring to FIG. 20, the optical transmission system generally denoted at 100 is constructed to effect bidirectional communication between a plurality of terminal stations, and includes, as such plurality of terminal stations, for example, an A station 101, a B station 102, a C station 103 and a D station 104. The A to D stations 101 to 104 are connected to each other by optical transmission lines 107 each formed from an optical fiber via light branching and insertion apparatus 105 and 106.

In particular, as seen from FIG. 20, the A station 101 and the C station 103 are connected to each other with the light branching and insertion apparatus 105 interposed therebetween, and the B station 102 and the D station 104 are connected to each other with the light branching and insertion apparatus 106 interposed therebetween. The A station 101 and the B station 102, the A station 101 and the D station 104, the B station 102 and the C station 103, and the C station 103 and the D station 104, are connected to each other with the light branching and insertion apparatus 105 and 106 interposed therebetween.

Each of the A to D stations 101 to 104 includes a plurality of transmission-reception apparatus each including a transmission apparatus 109 for transmitting signal light of a single wavelength and a reception apparatus 110 for receiving signal light transmitted from the transmission apparatus 109 of a different one of the transmission-reception apparatus.

A plurality of optical amplifiers 108 for amplifying signal light to be transmitted in a plurality of stages are provided for each of the optical transmission lines 107.

In the optical transmission system 100 shown in FIG. 20 and having the construction described above, signal light is communicated among the A to D stations 101 to 104.

On the other hand, in recent years, research and development for an optical transmission line formed from an optical fiber for wavelength multiplexing (WDM) which effects optical wavelength multiplexing transmission and for an optical amplifier for WDM as well as for a light branching and insertion apparatus for WDM have been and are being proceeded.

In an optical transmission system which employs such an optical transmission line or optical amplifier for WDM or light branching and insertion apparatus as just mentioned, a plurality of signal lights of different wavelengths are transmitted by means of a single optical transmission line, and the plurality of signal lights of the different wavelengths transmitted in this manner are amplified by a single optical amplifier and branching (wave separation or demultiplexing) or insertion (wave combination or multiplexing) of the signal light is performed depending upon the wavelength so that the signal lights are transmitted to desired terminal stations.

However, in an optical amplifier for WDM, since the gain of it has a wavelength dependency, when signal lights, for example, of 4 channels are transmitted, even if the ratios of the powers of the signal lights among the channels are equal as seen in FIG. 21(a), the ratios of the powers of the signal light among the channels after the signal lights are amplified in a plurality of stages and transmitted do not exhibit an equal value as seen from FIG. 21(b). It is to be noted that ASE (Amplified Spontaneous Emission) denoted in FIG. 21(b) is noise light produced by the optical amplifiers.

Where the ratios of the powers of the signal light after transmitted among the channels are not equal in this manner, since the S/N ratios of the signal lights are brought out of the mutually equal condition, the transmission characteristic of the signal lights in the optical transmission system is deteriorated.

Therefore, upon transmission of the signal lights, pre-emphasis which varies the ratios of the powers of the signal lights is performed so that the S/N ratios of the signal lights after transmitted may be equal to each other.

For example, if pre-emphasis is performed such that signal light of a wavelength which exhibits a comparatively high gain may have a comparatively low power as seen in FIG. 22(a), then the ratios of the powers of the signal lights after transmitted become equal to each other as seen in FIG. 22(b). Consequently, the S/N ratios of the signal lights can be made equal to each other.

In this instance, if the set condition of the pre-emphasis varies, then the S/N ratios of the signal lights after transmitted vary. Therefore, in order to prevent variation of the set condition of the pre-emphasis, automatic power control (APC) is performed such that back powers of laser diodes (LDs) which output the signal lights are monitored and the output powers of the laser diodes are adjusted in response to the magnitudes of the back powers so that the powers of the signal lights may always have values equal to those set by the pre-emphasis.

However, in a stage following each of such laser diodes, such apparatus as a modulator, a polarization scrambler and so forth are provided, and when signal light from each laser diode is transmitted through those apparatus, the signal light loses its power. The degree of the loss then is different among the different apparatus, and accordingly, the degree of the loss is different among the signal lights from the different laser diodes. Therefore, there is a subject to be solved in that, even if such automatic power control as described above is performed, the powers of the signal lights cannot be controlled so as to be equal to the respective preset values.

An improved apparatus is disclosed in Japanese Patent Laid-Open Application No. H 5-327662 wherein, as forward powers of laser diodes, the powers of signal lights from the laser diodes after the signal lights suffer from loss are monitored and the output powers of the laser diodes are controlled in response to the magnitudes of the powers so that the powers of the signal lights from the laser diodes may be equal to respective preset values.

However, with the automatic power control described above or the apparatus disclosed in Japanese Patent Laid-Open Application No. H 5-327662, control of the powers of signal lights is performed by varying the outputs of laser diodes. Where the outputs of the laser diodes are varied in this manner, since the temperature in the proximity of each laser diode varies, the wavelength of the output signal light from the laser diode varies.

In the ordinary optical transmission system 100 shown in FIG. 20, since the optical transmission lines 107 are provided individually for the signal lights, even if the wavelengths of the output signal lights vary a little, transmission and reception of the signal lights can be performed with certainty. However, in an optical transmission system for WDM wherein optical wavelength multiplexing transmission is performed, if the wavelengths of output signal light vary, then the branching-insertion characteristic of signal light of a light branching and insertion apparatus sometimes varies. Accordingly, the optical transmission system has another subject to be solved in that, in such an instance as just described, transmission and reception of signal light cannot be performed accurately.

SUMMARY OF THE INVENTION

It is an object of the present invention to provide a signal light outputting apparatus and an optical transmission system including such a signal light outputting apparatus wherein control of powers and/or wavelengths of signal lights of different wavelengths to be wavelength multiplexed and transmitted can be performed with certainty with a simple construction and the signal lights can be transmitted and received with certainty while making transmission characteristics of the signal lights of the different wavelengths equal to each other.

In order to attain the object described above, according to an aspect of the present invention, there is provided a signal light outputting apparatus, comprising a plurality of signal light outputting units each including a signal light source for outputting a signal light of a wavelength and an optical amplifier for amplifying the signal light outputted from the signal light source, an optical combiner for combining a plurality of signal lights of different wavelengths outputted from the signal light outputting units, a signal light power detector for extracting part of signal light combined by the optical combiner to detect powers of the signal light for individual wavelengths corresponding to the signal light wavelengths of the signal light sources, and a signal light output controller for controlling, in order to control the powers of the signal lights of the individual lights of the signal light combined by the optical combiner, signal light outputs of the corresponding optical amplifiers for amplification of the signal lights of the wavelengths in response to the powers of the signal lights of the individual wavelengths detected by the signal light power detector.

Preferably, the signal light outputting apparatus is constructed such that the signal light output controller includes a signal light power comparison and discrimination section for comparing the powers of the signal lights of the individual wavelengths detected by the signal light power detector with preset powers of signal lights of the individual wavelengths to discriminate whether or not the powers of the signal lights of the individual wavelengths detected by the signal light power detector are equal to the preset powers of the signal lights of the individual wavelengths, and controls the signal light outputs of the corresponding optical amplifiers for amplification of the signal lights of the wavelengths in response to results of the comparison and discrimination by the signal light power comparison and discrimination section.

Preferably, the signal light outputting apparatus is constructed such that the signal light power detector includes an optical spectrum analyzer.

The signal light outputting apparatus may be constructed such that the signal light power detector includes an optical separator for extracting part of the signal light combined by the optical combiner and separating the extracted signal light into signal lights of the individual wavelengths corresponding to the signal light wavelengths of the signal light sources, and a plurality of photo-electric converters for converting the signal lights separated by the optical separator into electric signals.

With the signal light outputting apparatus, in order to control the powers of signal lights of different wavelengths of signal light combined by the optical combiner, the signal light outputs of the corresponding optical amplifiers for amplification of the signal lights of the wavelengths are controlled. Consequently, the signal light outputting apparatus is advantageous in that the ratio of the powers of the signal lights set by pre-emphasis can be controlled with certainty.

According to another aspect of the present invention, there is provided a signal light outputting apparatus, comprising a plurality of signal light outputting units each including a signal light source for outputting a signal light of a wavelength and an optical amplifier for amplifying the signal light outputted from the signal light source, an optical combiner for combining a plurality of signal lights of different wavelengths outputted from the signal light outputting units, a signal light wavelength detector for extracting part of signal light combined by the optical combiner to detect wavelengths of the signal light for individual wavelengths corresponding to the signal light wavelengths of the signal light sources, and a signal light wavelength controller for controlling, in order to control the wavelengths of the signal light combined by the optical combiner, signal light wavelengths of the corresponding signal light sources for outputting of the signal lights of the wavelengths in response to the wavelengths of the signal lights detected by the signal light wavelength detector.

Preferably, the signal light outputting apparatus is constructed such that the signal light wavelength controller includes a signal light wavelength comparison and discrimination section for comparing the signal light wavelengths of the individual signal light sources detected by the signal light wavelength detector with preset signal light wavelengths of the individual signal light sources to discriminate whether or not the signal light wavelengths of the individual signal light sources detected by the signal light wavelength detector are equal to the preset signal light wavelengths of the individual signal light sources, and controls the signal light wavelengths of the corresponding signal light sources for outputting of the signal lights of the wavelengths in response to results of the comparison and discrimination by the signal light wavelength comparison and discrimination section.

Preferably, the signal light outputting apparatus is constructed such that it further comprises a light source temperature adjustment member provided for each of the signal light sources, and the signal light wavelength controller controls the light source temperature adjustment members provided for the individual signal light sources for outputting of the signal lights of the wavelengths to control the signal light wavelengths of the corresponding signal light sources.

Preferably, the signal light outputting apparatus is constructed such that the signal light wavelength detector includes an optical spectrum analyzer.

With the signal light outputting apparatus, in order to control the wavelengths of signal light combined by the optical combiner, the corresponding light source temperature adjustment members provided for the signal light sources for outputting of the signal lights of the wavelengths are controlled to control the wavelengths of the signal lights of the corresponding signal light sources for outputting of the signal lights of the wavelengths. Consequently, the signal light outputting apparatus is advantageous in that otherwise possible variation of the wavelengths of the signal lights can be controlled with certainty.

According to a further aspect of the present invention, there is provided a signal light outputting apparatus, comprising a plurality of signal light outputting units each including a signal light source for outputting a signal light of a wavelength and an optical amplifier for amplifying the signal light outputted from the signal light source, an optical combiner for combining a plurality of signal lights of different wavelengths outputted from the signal light outputting units, a signal light detection element for extracting part of signal light combined by the optical combiner to detect powers and wavelengths of the signal light for individual wavelengths corresponding to the signal light wavelengths of the signal light sources, a signal light output controller for controlling, in order to control the powers of the signal lights of the individual lights of the signal light combined by the optical combiner, signal light outputs of the corresponding optical amplifiers for amplification of the signal lights of the wavelengths in response to the powers of the signal lights of the individual wavelengths detected by the signal light detection element, and a signal light wavelength controller for controlling, in order to control the wavelengths of the signal light combined by the optical combiner, signal light wavelengths of the corresponding signal light sources for outputting of the signal lights of the wavelengths in response to the wavelengths of the signal lights detected-by the signal light detection element.

Preferably, the signal light outputting apparatus is constructed such that the signal light output controller includes a signal light power comparison and discrimination section for comparing the powers of the signal lights of the individual wavelengths detected by the signal light detection element with preset powers of signal lights of the individual wavelengths to discriminate whether or not the powers of the signal lights of the individual wavelengths detected by the signal light detection element are equal to the preset powers of the signal lights of the individual wavelengths, and controls the signal light outputs of the corresponding optical amplifiers for amplification of the signal lights of the wavelengths in response to results of the comparison and discrimination by the signal light power comparison and discrimination section, and the signal light wavelength controller includes a signal light wavelength comparison and discrimination section for comparing the signal light wavelengths of the individual signal light sources detected by the signal light detection element with preset signal light wavelengths of the individual signal light sources to discriminate whether or not the signal light wavelengths of the individual signal light sources detected by the signal light detection element are equal to the preset signal light wavelengths of the individual signal light sources, and controls the signal light wavelengths of the corresponding signal light sources for outputting of the signal lights of the wavelengths in response to results of the comparison and discrimination by the signal light wavelength comparison and discrimination section.

Preferably, the signal light outputting apparatus is constructed such that it further comprises a light source temperature adjustment member provided for each of the signal light sources, and the signal light wavelength controller controls the light source temperature adjustment members provided for the individual signal light sources for outputting of the signal lights of the wavelengths to control the signal light wavelengths of the corresponding signal light sources.

Preferably, the signal light outputting apparatus is constructed such that the signal light detection element includes an optical spectrum analyzer.

Preferably, the signal light outputting apparatus is constructed such that each of the light source temperature adjustment member includes a Peltier element.

With the signal light outputting apparatus, in order to control the powers and the wavelengths of signal lights of different wavelengths of signal light combined by the optical combiner, the signal light outputs of the corresponding optical amplifiers for amplification of the signal lights of the wavelengths are controlled and the corresponding light source temperature adjustment members provided for the signal light sources for outputting of the signal lights of the wavelengths are controlled to control the wavelengths of the signal lights of the corresponding signal light sources for outputting of the signal lights of the wavelengths. Consequently, otherwise possible variation of the wavelengths of the signal lights can be prevented while the ratio of the powers of the signal lights set by pre-emphasis can be controlled with certainty.

According to a still further aspect of the present invention with a signal light outputting apparatus, there is provided an optical transmission system, comprising a plurality of signal light outputting apparatus each including a plurality of signal light outputting units each including a signal light source for outputting a signal light of a wavelength and an optical amplifier for amplifying the signal light outputted from the signal light source, an optical combiner for combining a plurality of signal lights of different wavelengths outputted from the signal light outputting units, a signal light wavelength detector for extracting part of signal light combined by the optical combiner to detect wavelengths of the signal light for individual wavelengths corresponding to the signal light wavelengths of the signal light sources, and a signal light wavelength controller for controlling, in order to control the wavelengths of the signal light combined by the optical combiner, signal light wavelengths of the corresponding signal light sources for outputting of the signal lights of the wavelengths in response to the wavelengths of the signal lights detected by the signal light power detector, an optical fiber system for interconnecting the plurality of signal light outputting apparatus, and a light branching and/or insertion apparatus provided at a branching point of the optical fiber system by which the plurality of signal light outputting apparatus are interconnected, the light branching and/or insertion apparatus including a branching element for outputting a signal light of a selected wavelength from within the signal light inputted from an input side optical fiber to the light branching and/or insertion apparatus to an output side optical fiber and outputting signal lights of wavelengths other than the selected wavelength from within the signal light inputted from the input side optical fiber to the light branching and/or insertion apparatus to a branching output side optical fiber, and an insertion element for outputting signal light inputted thereto from a branching input side optical fiber to an output side optical fiber, signal light being communicated between the plurality of signal light outputting apparatus via the light branching and/or insertion apparatus.

With the optical transmission system with a signal light outputting apparatus, since it is constructed such that it includes a plurality of signal light outputting apparatus and a light branching and/or insertion apparatus provided at a branching point of the optical fiber system by which the plurality of signal light outputting apparatus are interconnected and signal light is communicated between the plurality of signal light outputting apparatus via the light branching and/or insertion apparatus, the optical transmission system is advantageous in that pre-emphasis when signal lights are outputted from the signal light outputting apparatus can be stabilized for a long period of time and a dispersion in transmission characteristic between the different signal lights can be suppressed to a minimum level and further in that variation in branching and insertion characteristic of the optical branching and/or insertion apparatus by variation in wavelength of the signal light can be prevented and communication of the signal light between the plurality of signal light outputting apparatus can be performed accurately.

According to a yet further aspect of the present invention, there is provided an optical transmission system with a signal light outputting apparatus, comprising a plurality of signal light outputting apparatus each including a plurality of signal light outputting units each including a signal light source for outputting a signal light of a wavelength and an optical amplifier for amplifying the signal light outputted from the signal light source, an optical combiner for combining a plurality of signal lights of different wavelengths outputted from the signal light outputting units, a signal light detection element for extracting part of signal light combined by the optical combiner to detect powers and wavelengths of the signal light for individual wavelengths corresponding to the signal light wavelengths of the signal light sources, a signal light output controller for controlling, in order to control magnitudes of the signal lights of the individual lights of the signal light combined by the optical combiner, signal light outputs of the corresponding optical amplifiers for amplification of the signal lights of the wavelengths in response to the powers of the signal lights of the individual wavelengths detected by the signal light detection element, and a signal light wavelength controller for controlling, in order to control the wavelengths of the signal light combined by the optical combiner, signal light wavelengths of the corresponding signal light sources for outputting of the signal lights of the wavelengths in response to the wavelengths of the signal lights detected by the signal light detection element, an optical fiber system for interconnecting the plurality of signal light outputting apparatus, and a light branching and/or insertion apparatus provided at a branching point of the optical fiber system by which the plurality of signal light outputting apparatus are interconnected, the light branching and/or insertion apparatus including a branching element for outputting a signal light of a selected wavelength from within the signal light inputted from an input side optical fiber to the light branching and/or insertion apparatus to an output side optical fiber and outputting signal lights of wavelengths other than the selected wavelength from within the signal light inputted from the input side optical fiber to the light branching and/or insertion apparatus to a branching output side optical fiber, and an insertion element for outputting signal light inputted thereto from a branching input side optical fiber to an output side optical fiber, signal light being communicated between the plurality of signal light outputting apparatus via the light branching and/or insertion apparatus.

With the optical transmission system with a signal light outputting apparatus, since it is constructed such that it includes a plurality of signal light outputting apparatus and a light branching and/or insertion apparatus provided at a branching point of the optical fiber system by which the plurality of signal light outputting apparatus are interconnected and signal light is communicated between the plurality of signal light outputting apparatus via the light branching and/or insertion apparatus, the optical transmission system is advantageous in that pre-emphasis when signal lights are outputted from the signal light outputting apparatus can be stabilized for a long period of time and a dispersion in transmission characteristic between the different signal lights can be suppressed to a minimum level and further in that variation in branching and insertion characteristic of the optical branching and/or insertion apparatus by variation in wavelength of the signal light can be prevented and communication of the signal light between the plurality of signal light outputting apparatus can be performed accurately.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 6 is a block diagram showing a construction of a light branching and insertion apparatus of the optical transmission system to which the signal light outputting apparatus of FIG. 1 is applied;

DESCRIPTION OF THE PREFERRED EMBODIMENTS a. Construction of Optical Transmission System FIG. 2 shows in block diagram an optical transmission system in which a signal light outputting apparatus according to the present invention is incorporated.

Referring to FIG. 2, the optical transmission system shown is generally denoted at 10 and performs optical communication between a plurality of terminal stations by wavelength multiplexing (WDM) transmission. The optical transmission system 10 includes, as the plurality of terminal stations, for example, an A station 1, a B station 2 and a C station 3. The A to C stations 1 to 3 are connected to each other by optical transmission lines 5 each formed from an optical fiber via a light branching and insertion apparatus 4.

Figure 1:
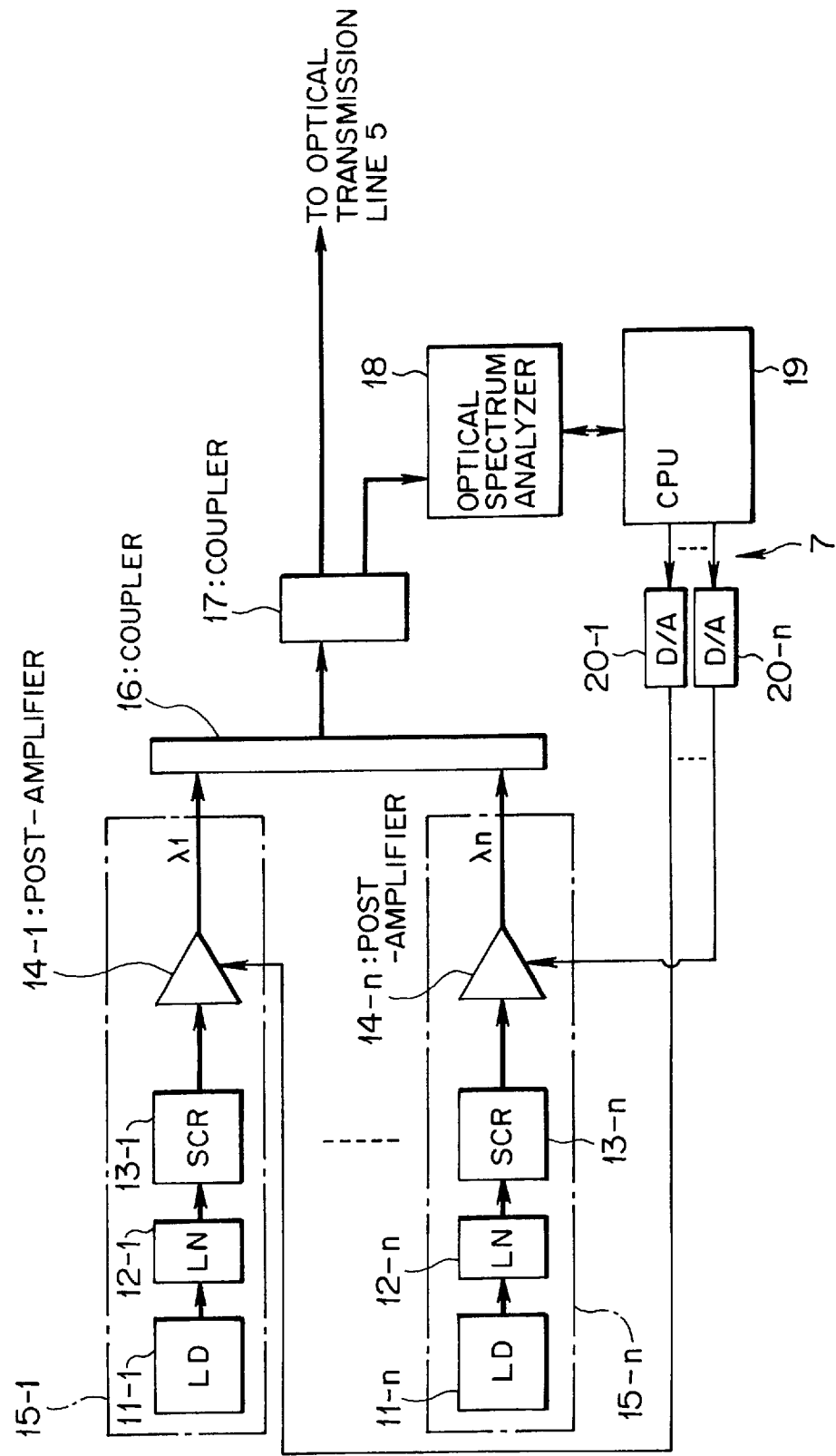
FIG. 1 is a block diagram showing a construction of a signal light outputting apparatus according to a first preferred embodiment of the present invention.

The A station 1 includes a transmission apparatus 7 for outputting and transmitting a plurality of signal lights of different wavelengths and serves as a transmission station. The B station 2 includes a reception apparatus 8 for receiving signal light transmitted thereto from another terminal station (in FIG. 2, the A station 1 or the C station 3) and serves as a reception station. The C station 3 includes a transmission apparatus 7 for outputting and transmitting a plurality of signal lights of different wavelengths and a reception apparatus 8 for receiving signal light transmitted thereto from another terminal station (in FIG. 2, the A station 1) and serves as a transmission and reception station.

A signal outputting apparatus according to the present invention is employed as the transmission apparatus 7 in any of the A to C stations 1 to 3 and has a construction and functions which will be hereinafter described in detail.

The light branching and insertion apparatus 4 is provided at a branching point of the optical transmission lines 5 which interconnect a plurality of terminal stations (in FIG. 2, the A station 1, B station 2 and C station 3) and outputs a signal light of a desired wavelength inputted thereto from any of the terminal stations 1 to 3 to another desired one of the terminal stations 1 to 3 to allow transmission of the signal light between the desired ones of the terminal A stations. Also the light branching and insertion apparatus 4 will be hereinafter described in detail.

Figure 2:
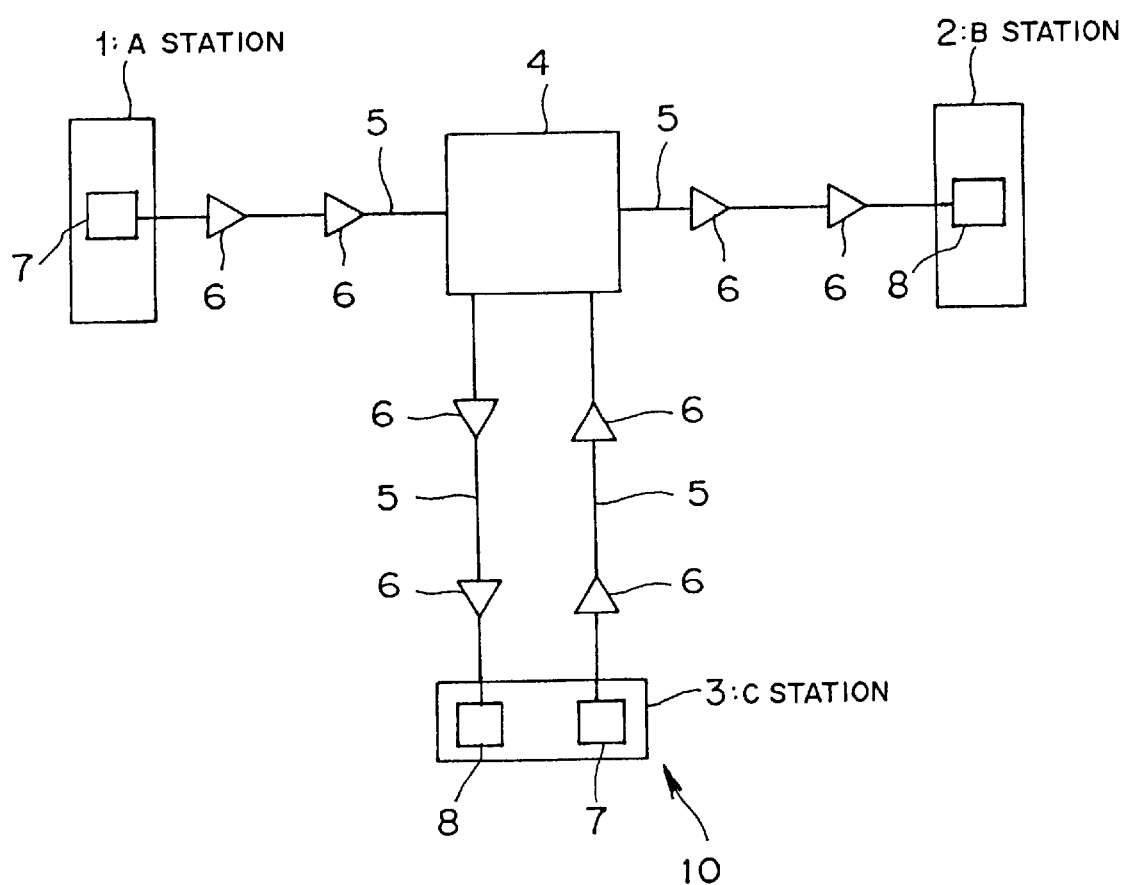
FIG. 2 is a block diagram showing a construction of an optical transmission system in which the signal light outputting apparatus of FIG. 1 is incorporated.

Each of the optical transmission lines 5 shown in FIG. 2 includes a plurality of optical amplifiers 6 interposed therein for repeating and amplifying signal light being transmitted in a plurality of stages.

In the optical transmission system 10 having the construction as described above with reference to FIG. 2, if a plurality of signal lights of different wavelengths are transmitted from the A station 1 while another signal light is transmitted from the C station 3, then those signal lights are inputted to the light branching and insertion apparatus 4 via suitable ones of the optical transmission lines 5.

The light branching and insertion apparatus 4 combines or multiplexes the signal light of a desired wavelength from within the signal light transmitted thereto from the A station 1 with the signal light transmitted thereto from the C station 3 and outputs the thus combined signal light to the B station 2. In the meantime, the light branching and insertion apparatus 4 branches the signal lights of the other wavelengths from within the signal light transmitted thereto from the A station 1 and outputs the branched signal lights to the C station 3.

b. First Form of Signal Light Outputting Apparatus (Transmission Apparatus)

FIG. 1 shows in block diagram a construction of a signal light outputting apparatus to which the present invention is applied.

Referring to FIG. 1, the signal light outputting apparatus 7 shown adjusts, when it outputs a plurality of signal lights $\lambda_1$ to $\lambda_n$ of different wavelengths, the powers of the signal lights $\lambda_1$ to $\lambda_n$ so that they may have values individually set in advance, and is used as a transmission apparatus in a plurality of terminals (in FIG. 2, the A to C stations 1 and 3) which transmit and receive, in such a system as the optical transmission system 10 shown in FIG. 2, signal light therebetween.

The signal light outputting apparatus 7 includes signal light outputting units 15-1 to 15-n, a coupler 16, an optical spectrum analyzer 18 and a central processing unit (CPU) 19.

The signal light outputting apparatus 7 further includes a 10:1 coupler 17, and digital to analog converters (D/A) 20-1 to 20-n.

It is to be noted that, in FIG. 1, each route along which a signal light passes is indicated by a thick line while each route along which an electric signal passes is indicated by a thin line.

The signal light outputting units 15-1 to 15-n output signal lights $\lambda_1$ to $\lambda_n$ having wavelengths different by 2 nm from each other within the wavelength range from 1,550 nm to 1560 nm.

The signal light outputting unit 15-1 includes a laser diode (LD) 11-1 serving as a signal light source for outputting a signal light ($\lambda_1$ in FIG. 1) of a desired wavelength, a modulator (LN) 12-1 for modulating the signal light outputted from the laser diode 11-1, a scrambler (SCR) 13-1 for converting the signal light outputted from the modulator 12-1 into a random code series, and a post-amplifier 14-1 serving as an optical amplifier for amplifying the signal light outputted from the scrambler 13-1 to a desired amplitude.

Also the signal light outputting unit 15-n includes a laser diode (LD) 11-n serving as a signal light source for outputting a signal light ($\lambda_n$ in FIG. 1) of a desired wavelength, a modulator (LN) 12-n for modulating the signal light outputted from the laser diode 11-n, a scrambler (SCR) 13-n for converting the signal light outputted from the modulator 12-n into a random code series, and a post-amplifier 14-n serving as an optical amplifier for amplifying the signal light outputted from the scrambler 13-n to a desired amplitude.

It is to be noted that, while, in the present embodiment, a lithium niobate ($LiNbO_3$; LN) Mach-Zehnder type modulator (such LN Mach-Zehnder type modulator is indicated by LN in FIG. 1) is used for the modulators 12-1 to 12-n, an electric absorption (EA) type modulator which makes use of an electric field absorption effect of a semiconductor may be employed instead.

Figure 3:
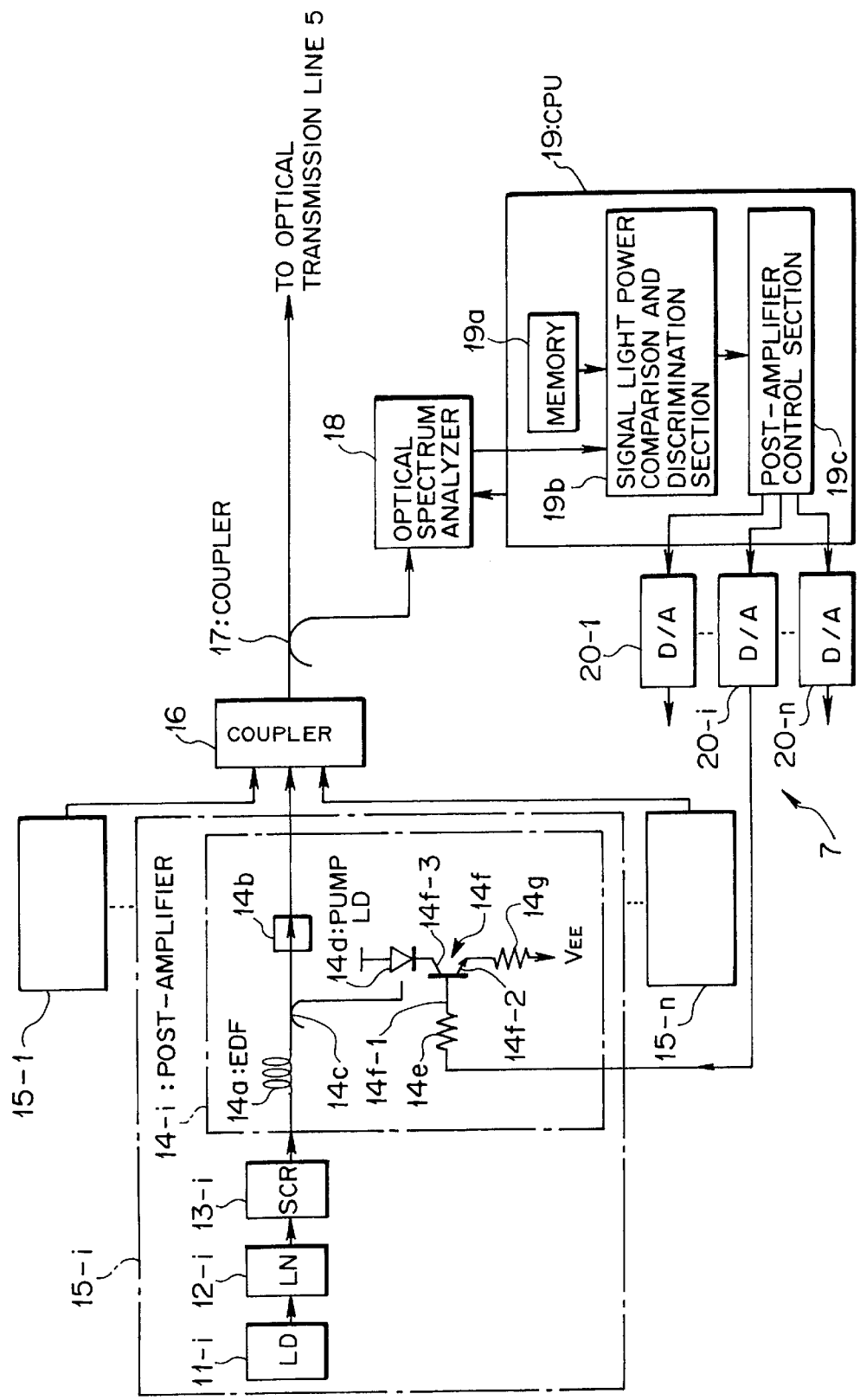
FIG. 3 is a block diagram showing details of a construction of part of the signal light outputting apparatus of FIG. 1.

Meanwhile, referring to FIG. 3, each of the post-amplifiers 14-1 to 14-n includes an erbium-doped fiber (EDF) 14a, an optical isolator 14b, an optical coupler 14c, a pump laser diode (pump LD) 14d, a transistor 14f and two resistors 14e and 14g. Details of the post-amplifiers 14-1 to 14-n will be hereinafter described. It is to be noted that FIG. 3 shows a post-amplifier 14-i (i=1, . . . , n).

The coupler 16 functions as an optical wave combining element for combining or multiplexing the plurality of signal lights $\lambda_1$ to $\lambda_n$ of different wavelengths outputted from the signal light outputting units 15-1 to 15-n.

The optical spectrum analyzer 18 functions as a signal light power detector which extracts part of signal light combined by the coupler 16 by means of the 10:1 coupler 17 and detects the powers of the combined signal light for individual wavelengths corresponding to the signal light wavelengths of the laser diodes 11-1 to 11-n of the signal light outputting units 15-1 to 15-n.

In other words, the optical spectrum analyzer 18 detects the powers of the signal lights $\lambda_1$ to $\lambda_n$ in the combined signal light to monitor signal light components of the combined signal light.

When signal light composed of the plurality of A signal lights $\lambda_1$ to $\lambda_n$ of different wavelengths is inputted, the optical spectrum analyzer 18 separates or demultiplexes the inputted signal light into the different signal lights and searches for peaks of the individual signal lights $\lambda_1$ to $\lambda_n$ to detect the powers and/or the wavelengths of the signal lights $\lambda_1$ to $\lambda_n$. Further, the optical spectrum analyzer 18 transmits and receives command signals to and from a personal computer (CPU 19 in FIG. 1) connected to the optical spectrum analyzer 18 to transmit detection data to the personal computer.

Figure 4:
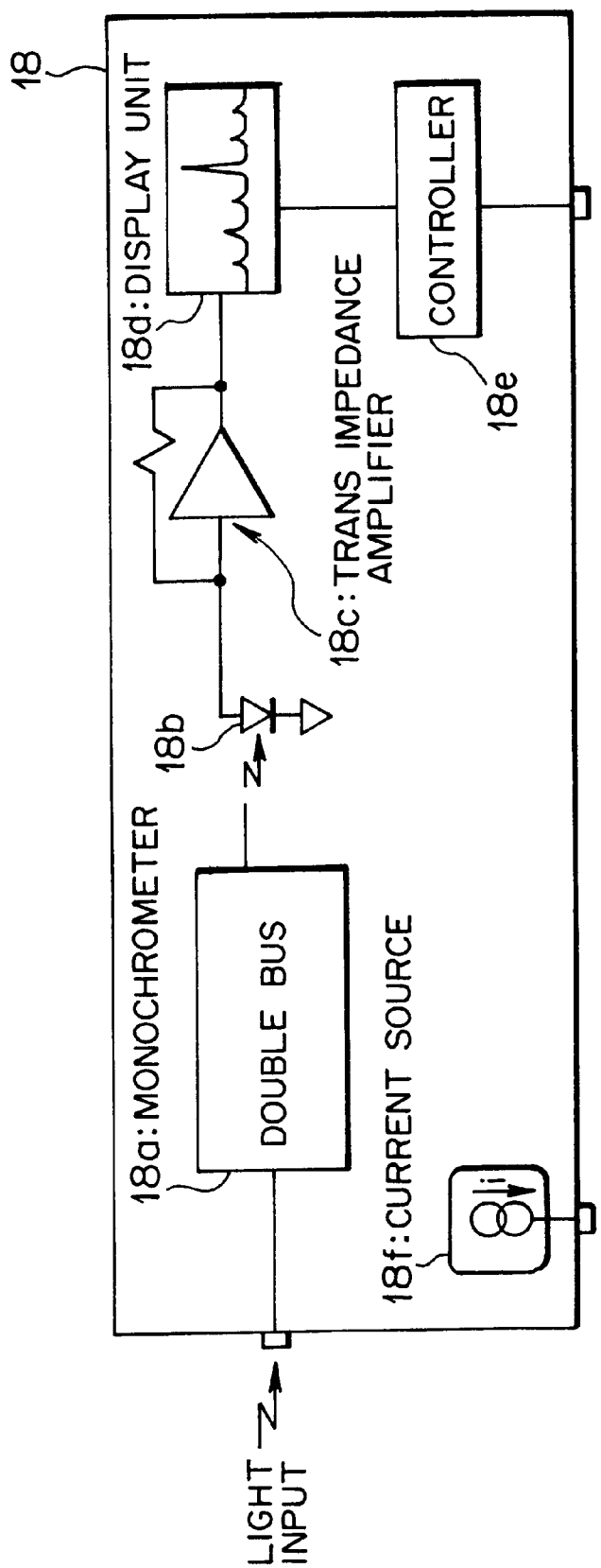
FIG. 4 is a block diagram showing a construction of an optical spectrum analyzer of the signal light outputting apparatus of FIG. 1.

More particularly, the optical spectrum analyzer 18 includes, for example, as shown in FIG. 4, a monochromator 18a, a photodiode 18b, a trans impedance amplifier 18c, a display unit 18d, a controller 18e and a current source 18f.

When combined signal light is inputted to the optical spectrum analyzer 18, the inputted signal light is separated into individual signal lights by the monochromator 18a. The thus separated signal lights $\lambda_1$ to $\lambda_n$ are detected by the photodiode 18b and amplified to a predetermined amplitude by the trans impedance amplifier 18c, and the powers and/or the wavelengths and so forth of the signal lights $\lambda_1$ to $\lambda_n$ are detected in response to the thus amplified signals. A result of the detection is displayed on the display unit 18d.

Data of the powers, wavelengths and so forth of the signal lights $\lambda_1$ to $\lambda_n$ thus detected are stored into a memory (not shown) provided in the controller 18e and transmitted to the personal computer not shown in FIG. 4 in response to a request for transmission from the personal computer.

In the present embodiment, operation of the optical spectrum analyzer 18 is controlled by the personal computer connected to the optical spectrum analyzer 18, that is, by the CPU 19 shown in FIG. 1.

It is to be noted that the resolution of the optical spectrum analyzer 18 may be approximately 0.2 nm and no higher resolution is required. Further, for transmission of detection data, the specification of the RS232C, GPIB or the like may be used.

By the way, the CPU 19 controls operation of the optical spectrum analyzer 18 as described above and also functions as a signal light output controller for controlling, in order to control the powers of the signal lights $\lambda_1$ to $\lambda_n$ of combined signal light, signal light outputs of the corresponding post-amplifiers 14-1 to 14-n in response to the powers of the signal lights $\lambda_1$ to $\lambda_n$ detected by the optical spectrum analyzer 18.

In order to realize the function as such signal light output controller, the CPU 19 includes, as seen in FIG. 3, a memory 19a for storing values of powers of the signal lights $\lambda_1$ to $\lambda_n$ set by pre-emphasis (this pre-emphasis signifies variation of the ratios of the powers of the plurality of signal lights $\lambda_1$ to $\lambda_n$ of different wavelengths upon transmission of the signal lights $\lambda_1$ to $\lambda_n$, that is, initially set values for the powers of the signal lights $\lambda_1$ to $\lambda_n$, and realizes functions corresponding to a signal light power comparison and discrimination section 19b and a post-amplification control section 19c by processing of software.

When detection data of the signal lights $\lambda_1$ to $\lambda_n$ are inputted from the optical spectrum analyzer 18, the signal light power comparison and discrimination section 19b reads out initially set values of the powers of signal lights corresponding to the inputted signal lights $\lambda_1$ to $\lambda_n$ from the memory 19a and compares the powers of the signal lights $\lambda_1$ to $\lambda_n$ detected by the optical spectrum analyzer 18 with the powers of the signal lights $\lambda_1$ to $\lambda_n$ set by the pre-emphasis to discriminate whether or not the values of the powers of the signal lights $\lambda_1$ to $\lambda_n$ detected by the optical spectrum analyzer 18 are equal to the values set by the pre-emphasis.

The post-amplification control section 19c outputs output control signals for controlling, in response to results of comparison and discrimination by the signal light power comparison and discrimination section 19b, signal light outputs of the corresponding post-amplifiers 14-1 to 14-n.

The output control signals outputted from the post-amplification control section 19c are converted from digital signals into analog signals by the digital to analog converters 20-1 to 20-n and then inputted to the post-amplifiers 14-1 to 14-n. It is to be noted that a digital to analog converter 20-i (i=1, . . . , n) is shown in FIG. 3.

Here, the post-amplifiers 14-1 to 14-n mentioned hereinabove are described.

Generally, when to transmit a plurality of signal lights of different wavelengths, pre-emphasis for varying the ratios of the powers of the signal lights is performed, and laser diodes which output the signal lights are controlled to vary the outputs of the laser diodes so that the powers of the signal lights may always be equal to values set by the pre-emphasis. However, where the outputs of the laser diodes are varied in this manner, since the temperatures in the proximity of the laser diodes vary, the wavelengths of the output signal lights of the laser diodes vary.

Figure 20:
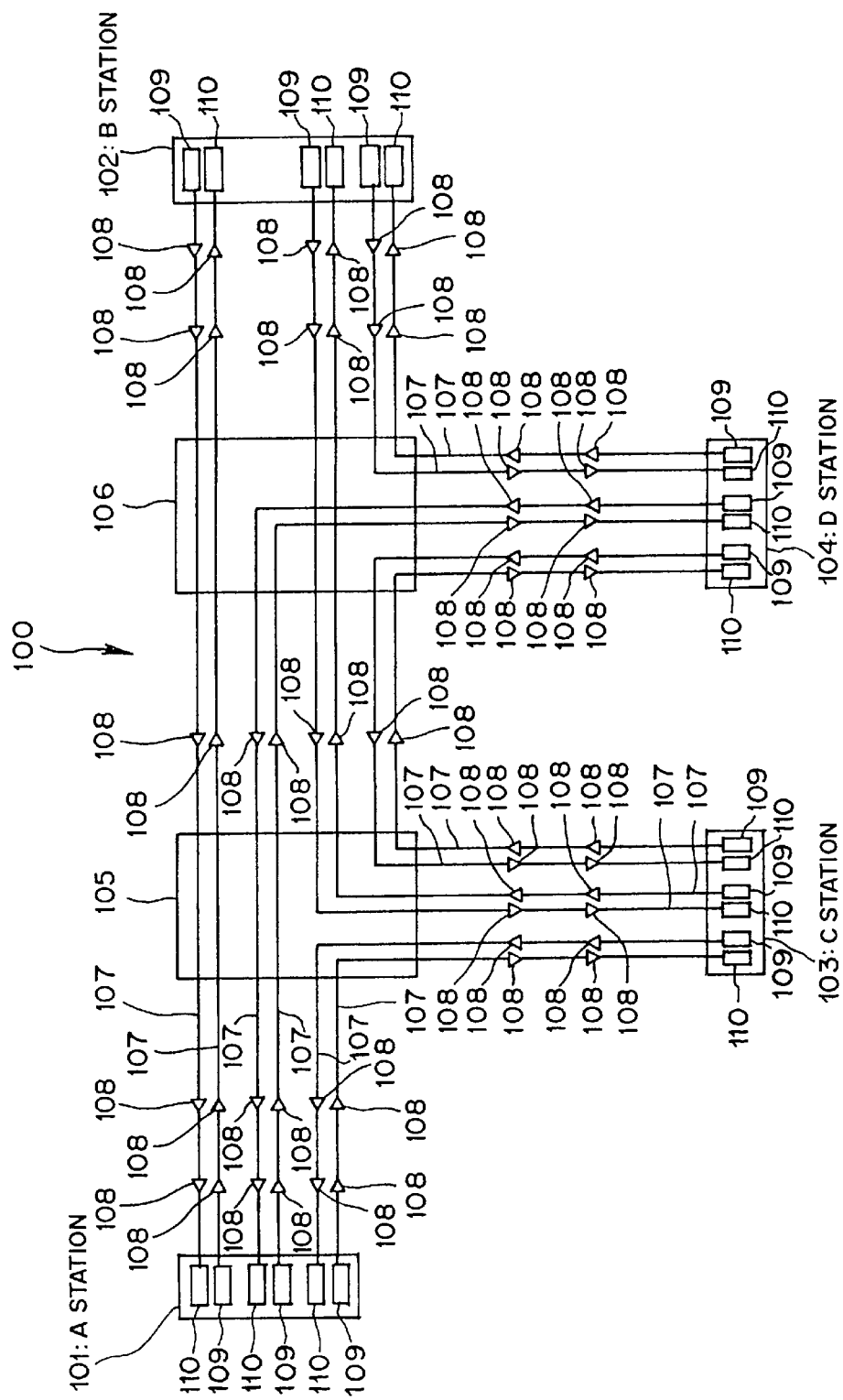
FIG. 20 is a diagrammatic view showing a construction of an ordinary optical transmission system.
Figure 21A:
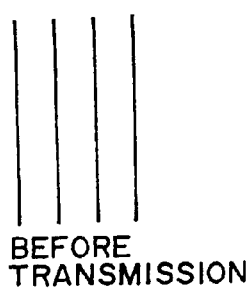
FIGS. 21(a) and 21(b) are diagrammatic views showing an example of an optical spectrum when signal light is transmitted without performing pre-emphasis.
Figure 21B:
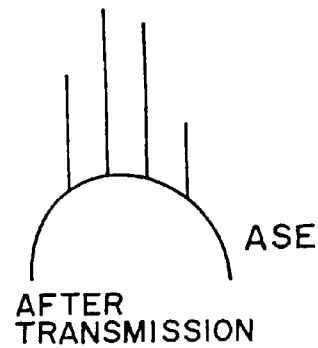
Figure 22A:
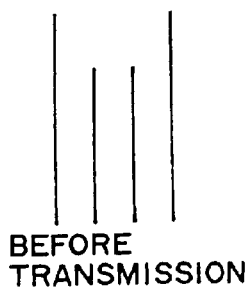
FIGS. 22(a) and 22(b) are diagrammatic views showing an example of an optical spectrum when signal light is transmitted after pre-emphasis is performed.
Figure 22B:
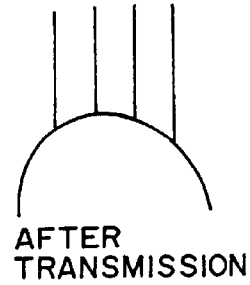

While, in an ordinary optical transmission system such as the optical transmission system 100 shown in FIG. 20, transmission and reception of signal light can be effected with certainty even if the wavelengths of output signal lights vary a little because the optical transmission lines 107 are provided for the individual signal lights, in the optical transmission system 10 shown in FIG. 2, if the wavelengths of the output signal lights vary, then this sometimes varies the branching and insertion characteristic of signal light of the light branching and insertion apparatus 4 which will be hereinafter described in detail. In this instance, transmission and reception of signal light cannot be performed accurately.

Therefore, in the signal light outputting apparatus 7 according to the present embodiment, the post-amplifiers 14-1 to 14-n are provided for the individual signal light outputting units 15-1 to 15-n, respectively, and the output levels of the signal lights $\lambda_1$ to $\lambda_n$ amplified by the post-amplifiers 14-1 to 14-n are controlled by the CPU 19 to control the signal light powers for the individual signal lights without allowing the outputs of the laser diodes 11-1 to 11-n to be varied, that is, without allowing the wavelengths of the signal lights to be varied.

More particularly, each of the post-amplifiers 14-1 to 14-n includes, as shown in FIG. 3, an erbium-doped fiber (EDF) 14a, an optical isolator 14b, an optical coupler 14c, a pump laser diode 14d, a transistor 14f and two resistors 14e and 14g as described hereinabove.

Referring to FIG. 3, the erbium-doped fiber 14a is an element which functions as an optical amplifier. The pump laser diode 14d is a pump light source for generating pump light of a predetermined band such as, for example, a 1.47 $\mu$m band or a 0.98 $\mu$m band. The erbium-doped fiber 14a and the pump laser diode 14d are connected to each other with the optical coupler 14c interposed therebetween.

The transistor 14f controls the bias current to the pump laser diode 14d to control the pump light output of the pump laser diode 14d.

The collector 14f-3 of the transistor 14f is connected to the pump laser diode 14d, and the emitter 14f-2 of the transistor 14f is connected to the resistor 14g. The base 14f-1 of the transistor 14f is connected to the post-amplification control section 19c of the CPU 19 via the resistor 14e and the digital to analog converter 20-i.

It is to be noted that the optical isolator 14b is provided in a stage following the optical coupler 14c so that it may prevent reflected signal light from being inputted to the post-amplifier 14-i.

In the post-amplifier 14-i having the construction described above, when an output control signal from the post-amplification control section 19c of the CPU 19 is inputted to the post-amplifier 14-i via the digital to analog converter 20-i, then electric current flowing from the collector 14f-3 of the transistor 14f to the emitter 14f-2 varies, and consequently, the bias current to the pump laser diode 14d varies.

When the bias current to the pump laser diode 14d varies in this manner, the pump light output of the pump laser diode 14d varies. Consequently, the optical amplification of the erbium-doped fiber 14a is controlled by the pump light output to control the signal light output of the post-amplifier 14-i.

It is to be noted that the output power of the post-amplifier 14-i is approximately +10 dBm.

In the signal light outputting apparatus 7 of the present embodiment having the construction described above, when signal lights $\lambda_1$ to $\lambda_n$ of different wavelengths are outputted from the signal light outputting units 15-1 to 15-n, respectively, the plurality of signal lights $\lambda_1$ to $\lambda_n$ thus outputted are combined by the coupler 16 and outputted to an optical transmission line 5.

Meanwhile, part of the signal light combined by the coupler 16 is inputted via the coupler 17 to the optical spectrum analyzer 18, by which the powers of the signal lights $\lambda_1$ to $\lambda_n$ of the combined signal light are detected from the inputted signal light. The CPU 19 controls, in order to control the powers of the signal lights $\lambda_1$ to $\lambda_n$ of the combined signal light, the signal light outputs of the corresponding post-amplifiers 14-1 to 14-n in response to the powers of the signal lights $\lambda_1$ to $\lambda_n$ detected by the optical spectrum analyzer 18.

Figure 5:
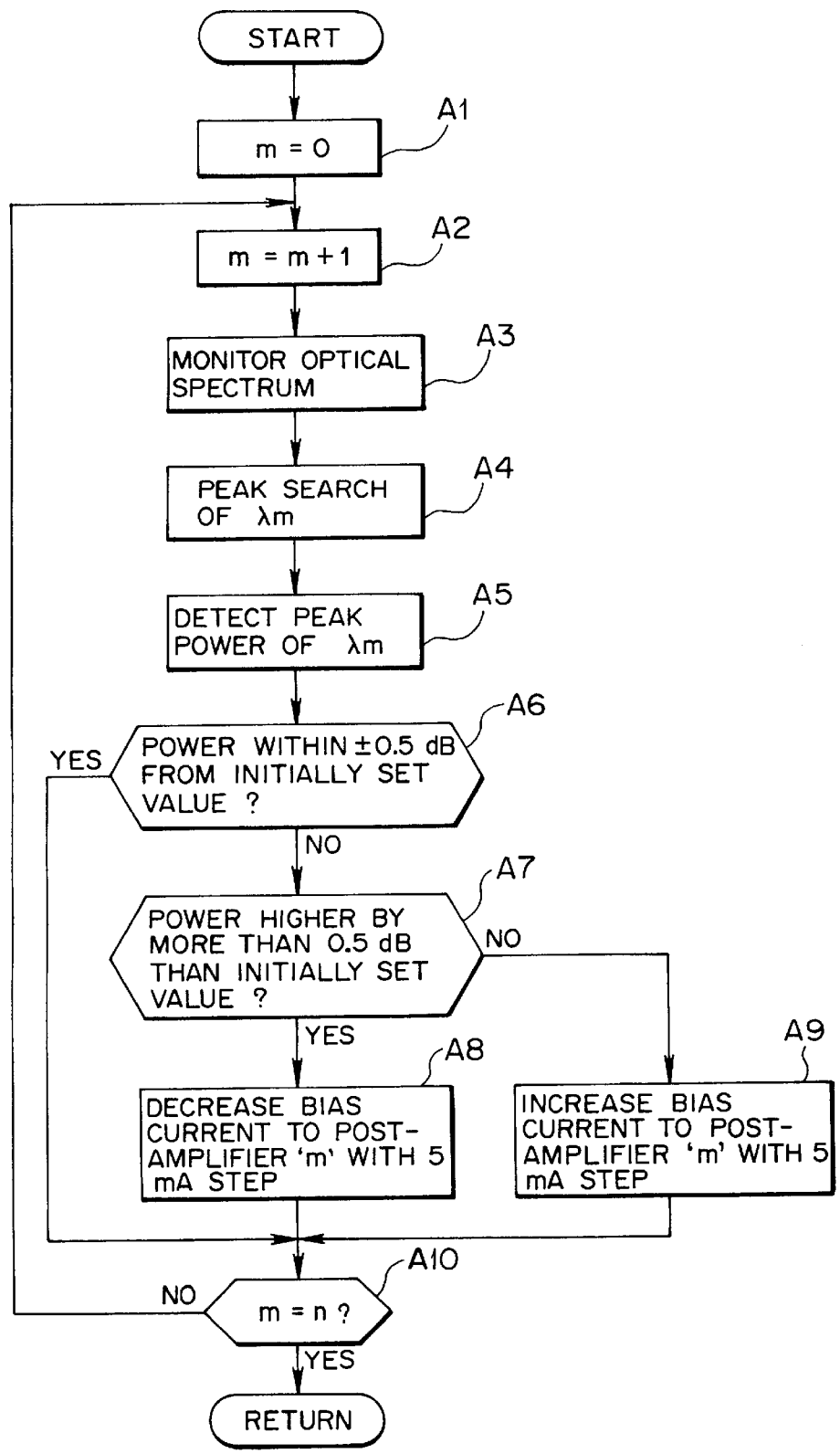
FIG. 5 is a flow chart illustrating operation of the signal light outputting apparatus of FIG. 1.

An example of operation performed by the optical spectrum analyzer 18 and the CPU 19 in this instance will be described in more detail with reference to FIG. 5.

If it is assumed that a signal light which is made an object of control is represented by $\lambda_m$, the CPU 19 resets m to 0 first in step A1, and then in step A2, the CPU 19 sets m to 1 so that the signal light which makes an object of control may be $\lambda_1$.

In response to this, the optical spectrum analyzer 18 extracts and monitors the signal light combined by the coupler 16 via the coupler 17 in step A3 and performs peak searching of the signal light $\lambda_1$ in step A4.

Further, the optical spectrum analyzer 18 detects the signal light power (peak power) of the signal light $\lambda_1$ and transmits the value of the detected power of the signal light $\lambda_1$ to the CPU 19 in response to a request for transmission from the CPU 19 in step A5.

In the CPU 19, when the value of the detected power of the signal light $\lambda_1$ is inputted, the signal light power comparison and discrimination section 19b reads out an initially set value for the power of the signal light $\lambda_1$ set by the pre-emphasis from the memory 19a and compares the value of the detected power of the signal light $\lambda_1$ with the initially set value to first discriminate whether or not the value of the detected power of the signal light $\lambda_1$ is within the range of ±0.5 dB from the initially set value in step A6.

If the value of the detected power of the signal light $\lambda_1$ is within the range of ±0.5 dB both inclusive from the initially set value, then it is determined that the value of the detected power of the signal light $\lambda_1$ is equal to the initially set value, and consequently, control of the output of the signal light of the post-amplifier 14-1 which amplifies the signal light $\lambda_1$ is not performed (from the YES route of step A6 to step A10).

On the other hand, when the value of the detected power of the signal light $\lambda_1$ is not within the range of ±0.5 dB from the initially set value, it is subsequently discriminated whether or not the value of the detected power of the signal light $\lambda_1$ is within a range higher by more than 0.5 dB than the initially set value (from the NO route of step A6 to step A7).

Here, if the value of the detected power of the signal light $\lambda_1$ is within the range higher by more than 0.5 dB than the initially set value, then an output control signal for decreasing the bias current to the post-amplifier 14-1 stepwise with a 5 mA step is outputted to effect control of the output of the signal light of the post-amplifier 14-1 which amplifies the signal light $\lambda_1$ (from the YES route of step A7 to step A8).

On the other hand, when the value of the detected power of the signal light $\lambda_1$ is not within the range higher by more than 0.5 dB than the initially set value, that is, when the value is within a range lower by more than 0.5 dB than the initially set value, an output control signal for increasing the bias current to the post-amplifier 14-1 stepwise with a 5 mA step is outputted to effect control of the output of signal light of the post-amplifier 14-1 which amplifies the signal light $\lambda_1$ (from the NO route of step A7 to step A9).

After the control of the signal light $\lambda_1$ is completed in this manner, the CPU 19 discriminates whether or not m=n to discriminate whether or not control of all of the signal lights λ1 to λn is completed in step A10. In this instance, since m=1 and control of all of the signal lights λ1 to λn is not completed, control of a signal light other than the signal light λ1 is started (from the NO route of step A10 to step A2).

Also the control of any other signal light than the signal light λ1 is performed in a similar manner as described above in connection with steps A2 to A9. Then, after the control of the signal light λn is completed, it is discriminated in step A10 that m=n, and consequently, the completion of the control of the powers of the signal lights is determined (the YES route of step A10).

It is to be noted that such control of the powers of the signal lights as described above is performed, for example, several times for one day.

In this manner, in the signal light outputting apparatus 7 according to the present embodiment, when a plurality of signal lights λ1 to λn of different wavelengths are combined and outputted, part of signal light obtained by the combination of the signal lights λ1 to λn is branched and extracted at an input end to an optical transmission line 5, and the powers of the signal lights λ1 to λn thus extracted are monitored by the optical spectrum analyzer 18. Then, while supervising whether or not the values of the powers of the signal lights λ1 to λn are equal to the respective initially set values, the CPU 19 controls the signal light outputs of the post-amplifiers 14-1 to 14-n so that the values of the powers of the signal lights λ1 to λn may always be equal to the initially set values. Consequently, the ratios of the powers of the signal lights λ1 to λn set by the pre-emphasis can be controlled with certainty.

Further, since the powers of the signal lights λ1 to λn are controlled by controlling the signal light outputs of the post-amplifiers 14-1 to 14-n, variation in wavelength of signal light which may arise from control of the output of a signal light source (laser diode) as in an ordinary signal light outputting apparatus can be prevented.

Consequently, in such an optical transmission system as the optical transmission system 10 shown in FIG. 2 wherein wavelength multiplexing (WDM) transmission is performed, pre-emphasis when signal light is outputted from a transmission apparatus 7 can be stabilized over a long period of time to minimize an otherwise possible dispersion in transmission characteristic among different signal lights and prevent otherwise possible variation of the branching and insertion characteristic of the light branching and insertion apparatus 4 caused by a variation in wavelength of signal light, and consequently, transmission and reception of signal light can be performed accurately between the terminal stations 1 to 3.

b1. Modification to First Form of Signal Light Outputting Apparatus (Transmission Apparatus)

Figure 12:
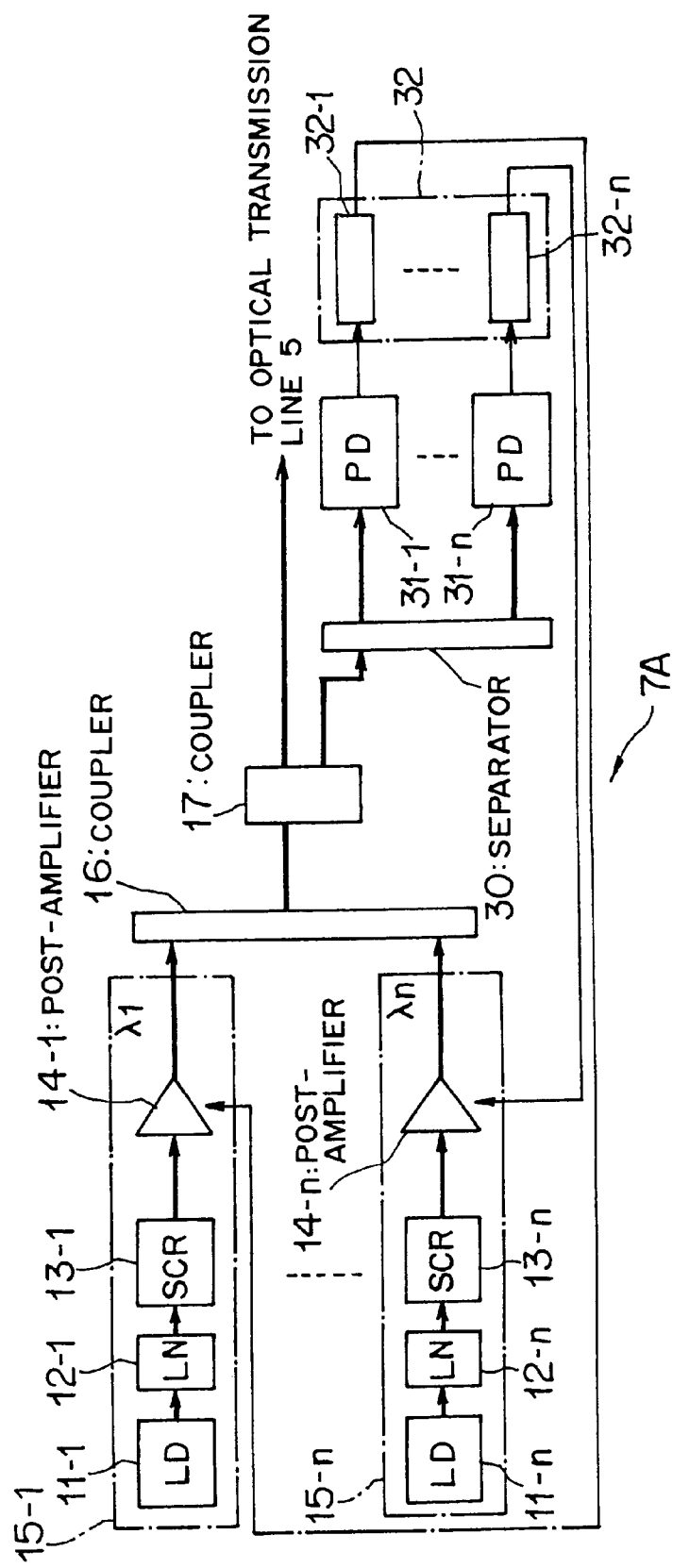
FIG. 12 is a block diagram showing a construction of a modification to the signal light outputting apparatus of FIG. 1.

FIG. 12 shows in block diagram a modification to the signal light outputting apparatus of the first embodiment of the present invention. Similarly to the signal light outputting apparatus 7 of the first embodiment described hereinabove, also the signal light outputting apparatus 7A shown in FIG. 12 adjusts, when to output a plurality of signal lights λ1 to λn of different wavelengths, the powers of the signal lights λ1 to λn so that they may be equal to values set in advance therefor and outputs the signal lights λ1 to λn of the adjusted powers. Thus, the signal light outputting apparatus 7A is used as a transmission apparatus for a terminal station which outputs signal light.

Referring to FIG. 12, the signal light outputting apparatus 7A includes signal light outputting units 15-1 to 15-n, a coupler 16, a separator or beam splitter 30, photodiodes (PD) 31-1 to 31-n, and a controller 32. The signal light outputting apparatus 7A further includes a 10:1 coupler 17.

It is to be noted that, in FIG. 12, a route along which signal light passes is indicated by a thick line, and a route along which an electric signal passes is indicated by a thin line.

In FIG. 12, those elements denoted by like reference characters to those of the signal light outputting apparatus 7 of the first embodiment shown in FIG. 1 have like constructs and functions.

The separator 30 extracts part of signal light combined by the coupler 16 via the coupler 17 and separates or demultiplexes the combined signal light for wavelengths corresponding to the signal light waves of the laser diodes 11-1 to 11-n of the signal light outputting units 15-1 to 15-n.

In short, the separator 30 extracts part of combined signal light and separates it into the individual signal lights λ1 to λn.

Figure 13:
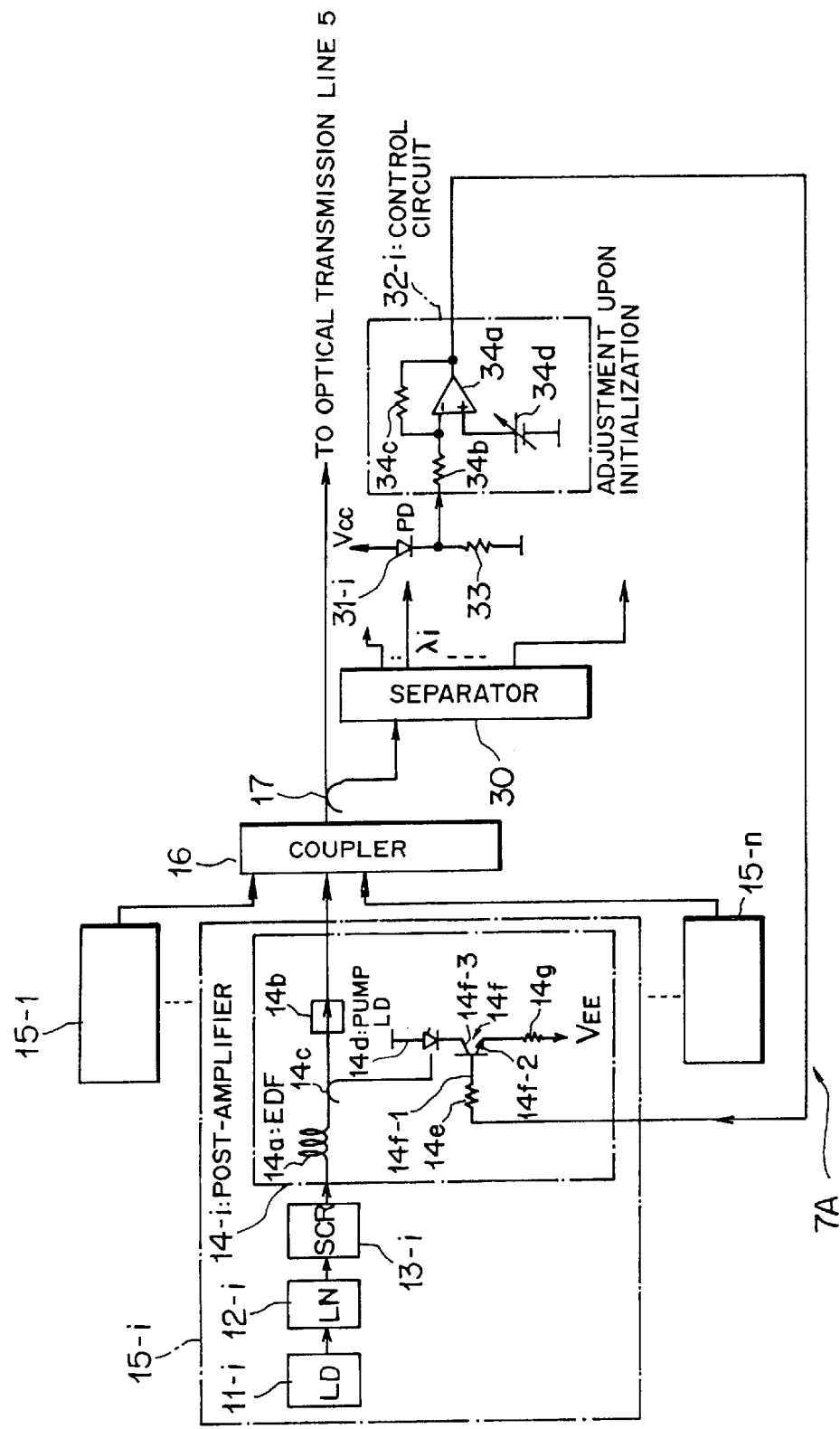
FIG. 13 is a block diagram showing details of a construction of part of the signal light outputting apparatus of FIG. 1.

The photodiodes (PD) 31-1 to 31-n are photo-electric converters which receive the signal lights λ1 to λn separated by the separator 30 and output electric signals corresponding to the signal light powers of the signal lights λ1 to λn. Each of the photodiodes 31-1 to 31-n has a grounded resistor 33 provided therefor as seen in FIG. 13. It is to be noted that a photodiode 31-i (i=1, . . . , n) is shown in FIG. 13.

In particular, in the present modification, the function as a signal light power detection section for detecting the powers of the signal lights λ1 to λn of combined signal light and monitoring the signal light components of the combined signal light is realized by the separator 30 and the photodiodes 31-1 to 31-n described above.

By the way, the controller 32 includes control circuits 32-1 to 32-n to which electric signals obtained by photo-electric conversion by the photodiodes 31-1 to 31-n are inputted, respectively.

Referring to FIG. 13, each of the control circuits 32-1 to 32-n includes an operational amplifier 34a which may be formed from a differential amplifier or a like element, a pair of resistors 34b and 34c, and a variable voltage source 34d which has a predetermined electromotive force so that an initial value of the power is set for each signal light. It is to be noted that a control circuit 32-i (i=1, . . . , n) is shown in FIG. 13.

Further, adjustment of each reference to the operational amplifier 34a (that is, an initial value for the power of each signal light) is performed by transmitting a signal light upon initialization of the signal light outputting apparatus 7A and adjusting the power of the signal light so that the S/N ratios of the signals at the input end to an optical transmission line 5 may be equal to each other.

In the control circuit 32-i shown in FIG. 13, if a predetermined voltage from the variable voltage source 34d is inputted as a reference voltage to the non-negated input terminal of the operational amplifier 34a and an electric signal representative of the power of a signal light separated from the photodiode 31-n is inputted to the negated input terminal of the operational amplifier 34a, then a voltage signal as a control signal for controlling the power of the signal light is outputted from the operational amplifier 34a.

The voltage signal outputted from the control circuit 32-i in this manner is inputted to the post-amplifier 14-i of a signal light outputting unit 15-i.

Further, in the post-amplifier 14-i, the voltage signal outputted from the control circuit 32-i is inputted to the transistor 14f so that control of the signal light output of the post-amplifier 14-i is performed in a similar manner as described hereinabove in connection with the first embodiment.

In particular, the control circuits 32-1 to 32-n of the controller 32 function as a signal light output controller for controlling, in order to control the powers of the signal lights $\lambda_1$ to $\lambda_n$ of the combined signal light, the signal light outputs of the corresponding post-amplifiers 14-1 to 14-n in response to the powers of the signal lights $\lambda_1$ to $\lambda_n$ detected by the signal light power detection section formed from the separator 30 and the photodiodes 31-1 to 31-n. More particularly, the control circuits 32-1 to 32-n have a function as a signal light power comparison and discrimination section for comparing the powers of the signal lights $\lambda_1$ to $\lambda_n$ detected by the photodiodes 31-1 to 31-n with the powers of the signal lights $\lambda_1$ to $\lambda_n$ set by the pre-emphasis to discriminate whether or not the values of the powers of the signal lights $\lambda_1$ to $\lambda_n$ detected by the photodiodes 31-1 to 31-n are equal to the values set by the pre-emphasis, and control the signal light outputs of the corresponding post-amplifiers 14-1 to 14-n in response to results of the comparison and discrimination.

It is to be noted that the output powers of the signal lights of the post-amplifiers 14-1 to 14-n are approximately +10 dBm, and the input powers of the signal lights to the photodiodes 31-1 to 31-n after the signal lights pass through the coupler 16, coupler 17 and separator 30 are approximately −10 dBm.

In the signal light outputting apparatus 7A according to the modification to the signal light outputting apparatus 7 of the first embodiment having the construction described above, similarly as in the signal light outputting apparatus 7 of the first embodiment, when signal lights $\lambda_1$ to $\lambda_n$ of different wavelengths are outputted from the signal light outputting units 15-1 to 15-n, respectively, the plurality of signal lights $\lambda_1$ to $\lambda_n$ thus outputted are combined by the coupler 16 and outputted to an optical transmission line 5.

Meanwhile, in the signal light outputting apparatus 7A of the present modification, part of the signal light combined by the coupler 16 is inputted to the separator 30 via the coupler 17. The inputted light is separated into the individual signal lights by the separator 30, and the thus separated signal lights $\lambda_1$ to $\lambda_n$ are received by the photodiodes 31-1 to 31-n, by which they are converted into electric signals corresponding to the signal light powers thereof, respectively.

The electric signals obtained by the photo-electric conversion by the photodiodes 31-1 to 31-n are inputted to the control circuits 32-1 to 32-n, respectively. Consequently, the control circuits 32-1 to 32-n control the signal light outputs of the post-amplifiers 14-1 to 14-n in response to the powers of the signal lights $\lambda_1$ to $\lambda_n$ detected by the photodiodes 31-1 to 31-n in order to control the powers of the corresponding signal lights $\lambda_1$ to $\lambda_n$ of the combined signal light.

In this manner, the signal light outputting apparatus 7A according to the modification to the signal light outputting apparatus 7 of the first embodiment of the present invention branches and extracts, when a plurality of signal lights $\lambda_1$ to $\lambda_n$ of different wavelengths are combined and outputted, part of the combined signal light of the signal lights $\lambda_1$ to $\lambda_n$ at the input end to the optical transmission line 5, and monitors the powers of the signal lights $\lambda_1$ to $\lambda_n$ by means of the separator 30, photodiodes 31-1 to 31-n and controller 32 and controls the signal light outputs of the post-amplifiers 14-1 to 14-n so that the powers of the signal lights $\lambda_1$ to $\lambda_n$ may always be equal to initially set values therefor. Consequently, similar advantages to those achieved by the signal light outputting apparatus 7 of the first embodiment are achieved by the modified signal light outputting apparatus 7A.

Further, in the signal light outputting apparatus 7A of the present modification, the functions as a signal light power detection section for detecting the powers of the signal lights $\lambda_1$ to $\lambda_n$ of the combined signal light and monitoring the signal light components of the combined signal light are realized by the separator 30 and photodiodes 31-1 to 31-n, and the functions as a signal light output controller for controlling, in order to control the powers of the signal lights $\lambda_1$ to $\lambda_n$ of the combined signal light, the signal light outputs of the corresponding post-amplifiers 14-1 to 14-n in response to the powers of the signal lights $\lambda_1$ to $\lambda_n$ detected by the separator 30 and the photodiodes 31-1 to 31-n are realized by the controller 32. Consequently, the signal light outputting apparatus can be produced at a reduced cost.

b2. Second Form of Signal Light Outputting Apparatus (Transmission Apparatus)

Figure 14:
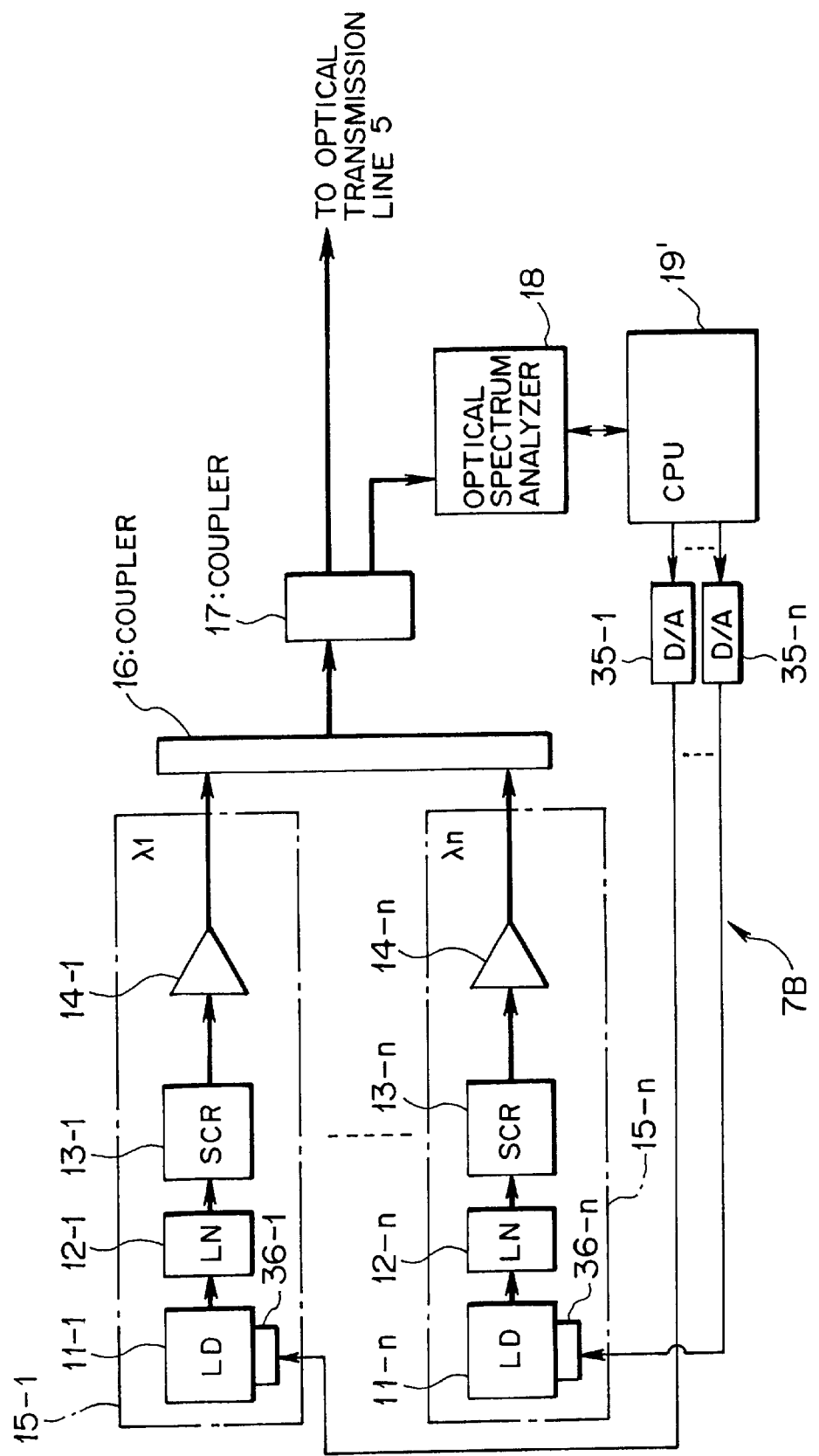
FIG. 14 is a block diagram showing a construction of a signal light outputting apparatus according to a second preferred embodiment of the present invention.

FIG. 14 shows in block diagram another signal light outputting apparatus to which the present invention is applied. The signal light outputting apparatus 7B shown in FIG. 14 adjusts, when to output a plurality of signal lights $\lambda_1$ to $\lambda_n$ of different wavelengths, the wavelengths of signal lights $\lambda_1$ to $\lambda_n$ so that they may be equal to values set in advance therefor and outputs the signal lights $\lambda_1$ to $\lambda_n$ of the adjusted powers. Thus, the signal light outputting apparatus 7B is used as a transmission apparatus for a plurality of terminal stations (in FIG. 2, the A station 1 and the C station 3) which transmit and receive signal light therebetween in such a system as the optical transmission system 10 shown in FIG. 2 as described hereinabove.

Referring to FIG. 14, the signal light outputting apparatus 7B includes signal light outputting units 15-1 to 15-n, a coupler 16, an optical spectrum analyzer 18 and a CPU 19'.

The signal light outputting apparatus 7B further includes a 10:1 coupler 17, and digital to analog converters (D/A) 35-1 to 35-n.

It is to be noted that, in FIG. 14, each route along which signal light passes is indicated by a thick line, and a route along which an electric signal passes is indicated by a thin line.

In FIG. 14, those elements denoted by like reference characters to those of the signal light outputting apparatus 7 of the first embodiment shown in FIG. 1 have like constructs and functions. In the signal light outputting apparatus 7B of the present embodiment, the optical spectrum analyzer 18 functions as a signal light wavelength detection section for detecting, from signal light combined by the coupler 16 and extracted partly by the coupler 17, wavelengths of the combined signal light for wavelengths corresponding to the signal light wavelengths of the laser diodes 11-1 to 11-n of the signal light outputting units 15-1 to 15-n.

In the present embodiment, laser diode temperature adjustment members 36-1 to 36-n as light source temperature adjustment members for controlling the wavelengths of the output signal lights from the laser diodes 11-1 to 11-n by adjusting the temperatures in the proximity of the laser diodes 11-1 to 11-n are provided for the laser diodes 11-1 to 11-n, respectively. Details of the laser diode temperature adjustment members 36-1 to 36-n will be hereinafter described.

The CPU 19' controls operation of the optical spectrum analyzer 18 and functions as a signal light wavelength controller for controlling, in order to control the wavelengths of the signal lights $\lambda_1$ to $\lambda_n$ of the combined signal light, the signal light wavelengths of the corresponding laser diodes 11-1 to 11-n in response to the wavelengths of the signal lights $\lambda_1$ to $\lambda_n$ detected by the optical spectrum analyzer 18.

Control of the wavelengths of the output signal lights of the corresponding laser diodes 11-1 to 11-n in this instance is performed by controlling the temperatures of the laser diode temperature adjustment members 36-1 to 36-n provided for the corresponding laser diodes 11-1 to 11-n, respectively.

Figure 15:
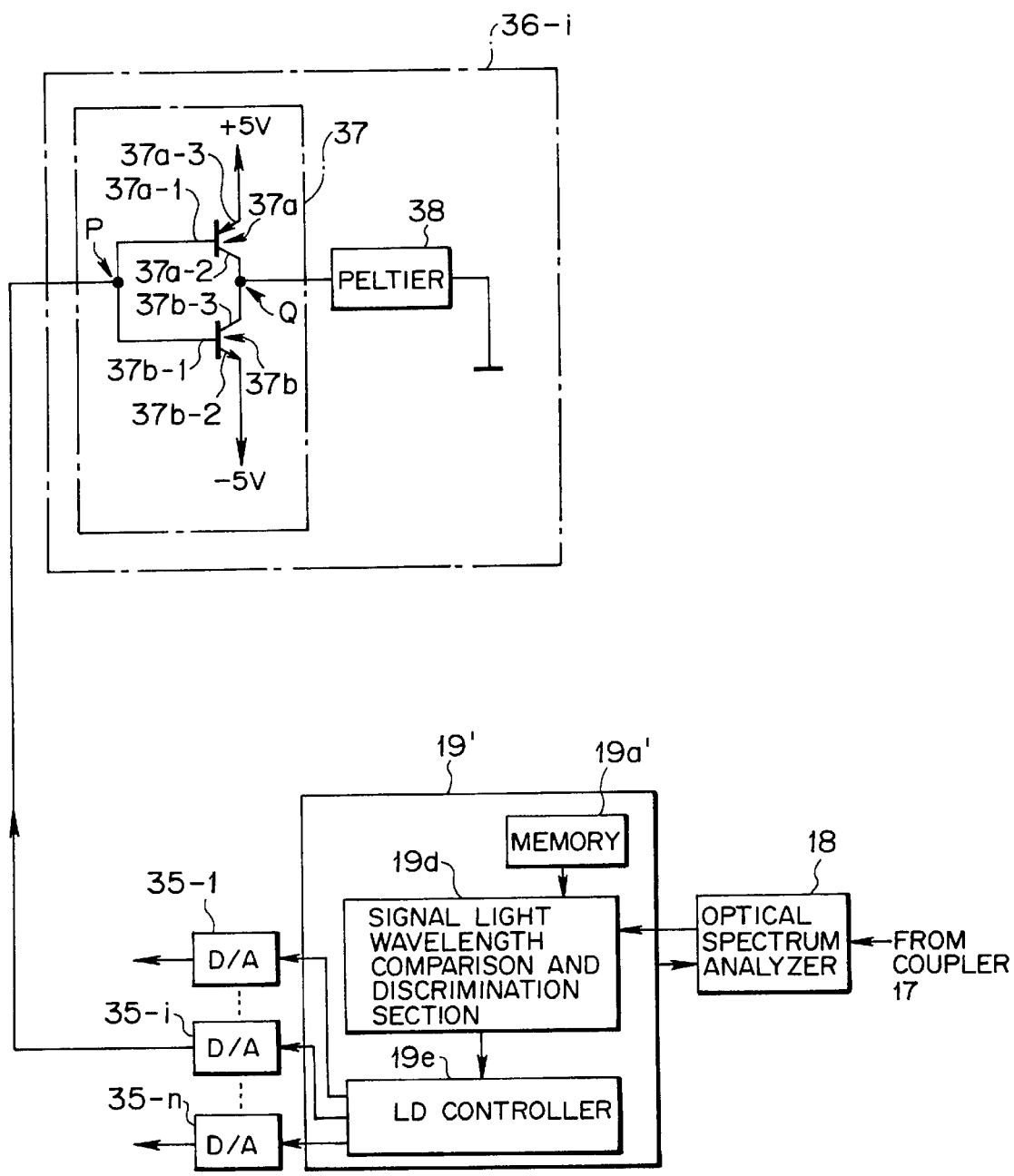
FIG. 15 is a block diagram showing details of a construction of part of the signal light outputting apparatus of FIG. 14.

In order to realize the function as the signal light wavelength controller, the CPU 19' includes, as shown in FIG. 15, a memory 19a' for storing values of the wavelengths of the signal lights $\lambda_1$ to $\lambda_n$, that is, initially set values of the wavelengths of the signal lights $\lambda_1$ to $\lambda_n$, and realizes the functions corresponding to a signal light wavelength comparison and discrimination section 19d and a laser diode (LD) controller 19e by processing of software.

When detection data of the signal lights $\lambda_1$ to $\lambda_n$ are inputted from the optical spectrum analyzer 18, the signal light wavelength comparison and discrimination section 19d reads out the initially set values of the wavelengths of the signal lights corresponding to the inputted signal lights $\lambda_1$ to $\lambda_n$ from the memory 19a', and compares the wavelengths of the signal lights $\lambda_1$ to $\lambda_n$ detected by the optical spectrum analyzer 18 with the wavelengths of the signal lights $\lambda_1$ to $\lambda_n$ set in advance to discriminate whether or not the values of the wavelengths of the signal lights $\lambda_1$ to $\lambda_n$ detected by the optical spectrum analyzer 18 are equal to the respective preset values.

The laser diode controller 19e outputs wavelength control signals for controlling the signal light wavelengths of the corresponding laser diodes 11-1 to 11-n in response to a result of the comparison and discrimination by the signal light wavelength comparison and discrimination section 19d.

It is to be noted that the wavelength control signals outputted from the laser diode controller 19e are converted from digital signals into analog signals of voltages corresponding to displacements between the wavelengths of the signal lights $\lambda_1$ to $\lambda_n$ detected by the optical spectrum analyzer 18 and the wavelengths of the signal lights $\lambda_1$ to $\lambda_n$ set in advance by means of the digital to analog converters 35-1 to 35-n. In this instance, for example, if a detected wavelength is longer than a corresponding preset value, it is converted into a positive voltage, but if it is shorter than the corresponding preset value, it is converted into a negative voltage. The voltages thus obtained are inputted to the laser diode temperature adjustment members 36-1 to 36-n.

Here, the laser diode temperature adjustment members 36-1 to 36-n mentioned above will be described.

Each of the laser diode temperature adjustment members 36-1 to 36-n includes, as shown in FIG. 15, a Peltier element 38 and a Peltier element operation circuit 37. It is to be noted that a laser diode temperature adjustment member 36-i (i=1, . . . , n) is shown in FIG. 15.

Referring to FIG. 15, the Peltier element 38 generates or absorbs heat depending upon the direction of electric current flowing therethrough so that the laser diode temperature adjustment member 36-i may have a desired temperature.

Further, the Peltier element operation circuit 37 is provided in a stage preceding the Peltier element 38 and flows electric current through the Peltier element 38 to operate the Peltier element 38. The Peltier element operation circuit 37 includes a pair of transistors 37a and 37b of different types connected in parallel to each other.

In the Peltier element operation circuit 37, the base 37a-1 of the transistor 37a and the base 37b-1 of the transistor 37b are connected to each other. The junction between the base 37a-1 and the base 37b-1 is denoted at P. Further, the emitter 37a-2 of the transistor 37a and the collector 37b-3 of the transistor 37b are connected to each other. The junction between the emitter 37a-2 and the collector 37b-3 is denoted at Q.

A wavelength control signal (which will be hereinafter described) outputted from the CPU 19' is inputted to the junction P via a digital to analog converter 35-i, and the junction Q is connected to a terminal of the Peltier element 38.

It is to be noted that a digital to analog converter 35-i (i=1, . . . , n) is shown in FIG. 15.

On the other hand, the other terminal of the Peltier element 38 is grounded, and a resistor may be interposed between the junction P and each of the digital to analog converters 35-1 to 35-n.

In the laser diode temperature adjustment member 36-i having the construction described above, when a wavelength control signal from the laser diode controller 19e of the CPU 19' is inputted via the digital to analog converter 35-i, one of the transistor 37a and the transistor 37b operates in response to the polarity (positive or negative) and the magnitude of the inputted voltage.

When the transistor 37a operates, a voltage is applied to the base 37a-1 of the transistor 37a and electric current flows from the collector 37a-3 of the transistor 37a to the Peltier element 38 via the emitter 37a-2 of the transistor 37a and the junction Q.

On the other hand, when the transistor 37b operates, a voltage is applied to the base 37b-1 of the transistor 37b and electric current flows from the Peltier element 38 to the emitter 37b-2 of the transistor 37b via the junction Q and the collector 37b-3 of the transistor 37b.

Further, by controlling the direction of the electric current flowing through the Peltier element 38, the heat generation or absorption amount of the Peltier element 38 is varied in response to the direction and the magnitude of electric current flowing therethrough, and the temperature of the laser diode temperature adjustment member 36-i is controlled thereby.

Where the temperatures of the laser diode temperature adjustment members 36-1 to 36-n are controlled in this manner, the temperatures in the proximity of the corresponding laser diodes 11-1 to 11-n are adjusted to control the wavelengths of the output signal lights from the laser diodes 11-1 to 11-n.

In the signal light outputting apparatus 7B of the present embodiment having the construction described above, when signal lights $\lambda_1$ to $\lambda_n$ of different wavelengths are outputted from the signal light outputting units 15-1 to 15-n, the plurality of signal lights $\lambda_1$ to $\lambda_n$ thus outputted are combined by the coupler 16 and outputted to an optical transmission line 5.

Meanwhile, part of the signal light combined by the coupler 16 is inputted via the coupler 17 to the ptical spectrum analyzer 18, by which the wavelengths of the signal lights $\lambda_1$ to $\lambda_n$ of the combined signal light are detected from the inputted signal light. The CPU 19' controls, in order to control the wavelengths of the signal lights $\lambda_1$ to $\lambda_n$ of the combined signal light, the temperatures of the corresponding laser diode temperature adjustment members 36-1 to 36-n in response to the wavelengths of the signal lights $\lambda_1$ to $\lambda_n$ detected by the optical spectrum analyzer 18 thereby to control the signal light outputs from the laser diodes 11-1 to 11-n.

Figure 16:
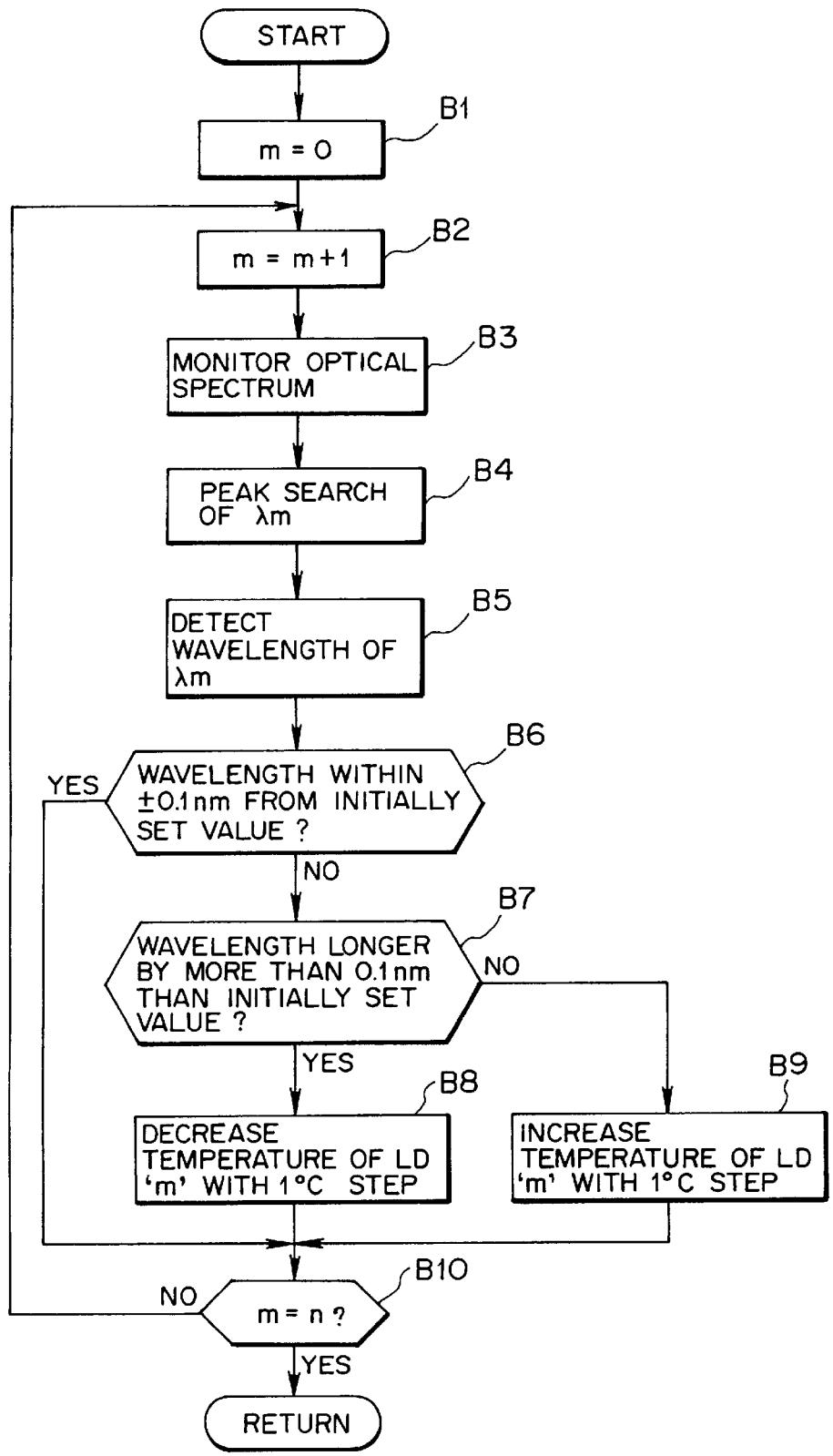
FIG. 16 is a flow chart illustrating operation of the signal light outputting apparatus of FIG. 14.

An example of operation performed by the optical spectrum analyzer 18 and the CPU 19' then will be described in more detail with reference to FIG. 16.

Where a signal light which makes an object of control is represented by $\lambda_m$, the CPU 19' resets m to 0 first in step B1 and then sets m to 1 so that the signal light which makes an object of control may be $\lambda_1$ in step B2.

In response to the setting, the optical spectrum analyzer 18 monitors the signal light combined by the coupler 16 and extracted by the coupler 17 in step B3, and performs peak searching of the signal light $\lambda_1$ in step B4.

Further, the optical spectrum analyzer 18 detects the signal light wavelength of the signal light $\lambda_1$ and transmits the value of the detected wavelength of the signal light $\lambda_1$ to the CPU 19' in response to a transmission request from the CPU 19' in step B5.

In the CPU 19', when the value of the detected wavelength of the signal light $\lambda_1$ is inputted, an initially set value for the wavelength of the signal light $\lambda_1$ is read out from the memory 19$a'$, and the value of the detected wavelength of the signal light $\lambda_1$ and the initially set value are compared with each other to discriminate whether or not the value of the detected wavelength of the signal light $\lambda_1$ is within a range of ±0.1 nm from the initially set value in step B6.

If the value of the wavelength of the signal light $\lambda_1$ is within the range of ±0.1 nm both inclusive from the initially set value, then it is determined that the value of the detected wavelength of the signal light $\lambda_1$ is equal to the initially set value, and control of the output of the signal light of the laser diode 11-1 which outputs the signal light $\lambda_1$ is not performed (from the YES route of step B6 to step B10).

On the other hand, when the value of the wavelength of the signal light $\lambda_1$ is not within the range of ±0.1 nm from the initially set value, it is subsequently discriminated whether or not the value of the detected wavelength of the signal light $\lambda_1$ is within a range higher by more than 0.1 nm than the initially set value (from the NO route of step B6 to step B7).

When the value of the detected wavelength of the signal light $\lambda_1$ is within the range higher by more than 0.1 nm than the initially set value, a wavelength control signal for decreasing the temperature of the laser diode 11-1 stepwise with a 1° C. step is outputted to effect control of the wavelength of the signal light of the laser diode 11-1 which outputs the signal light $\lambda_1$ (from the YES route of step B7 to step B8).

On the other hand, when the value of the detected wavelength of the signal light $\lambda_1$ is not within the range higher by more than 0.1 nm than the initially set value, that is, when the value is within a range lower by more than 0.1 nm than the initially set value, a wavelength control signal for increasing the temperature of the laser diode 11-1 stepwise with a 1° C. step is outputted to effect control of the wavelength of the signal light of the laser diode 11-1 which outputs the signal light $\lambda_1$ (from the NO route of step B7 to step B9).

After the control of the signal light $\lambda_1$ is completed in this manner, the CPU 19' discriminates whether or not m=n to discriminate whether or not control of all of the signal lights $\lambda_1$ to $\lambda_n$ is completed in step B10. In this instance, since m=1 and control of all of the signal lights $\lambda_1$ to $\lambda_n$ is not completed, control of a signal light other than the signal light $\lambda_1$ is started (from the NO route of step B10 to step B2).

Also the control of any other signal light than the signal light $\lambda_1$ is performed in a similar manner as described above in connection with steps B2 to B9. Then, after the control of the signal light $\lambda_n$ is completed, it is discriminated in step B10 that m=n, and consequently, the control of the wavelengths of the signal lights is ended (the YES route of step B10).

It is to be noted that such control of the wavelengths of the signal lights as described above is performed, for example, several times for one day.

In this manner, in the signal light outputting apparatus 7B of the present embodiment, when a plurality of signal lights $\lambda_1$ to $\lambda_n$ of different wavelengths are combined and outputted, part of signal light obtained by the combination of the signal lights $\lambda_1$ to $\lambda_n$ is branched and extracted at an input end to an optical transmission line 5, and the wavelengths of the signal lights $\lambda_1$ to $\lambda_n$ are monitored by the optical spectrum analyzer 18. Then, while supervising whether or not the values of the powers of the signal lights $\lambda_1$ to $\lambda_n$ may be equal to the respective initially set values, the CPU 19' controls the signal light wavelengths of the laser diodes 11-1 to 11-n so that the values of the wavelengths of the signal lights $\lambda_1$ to $\lambda_n$ may always be equal to the initially set values. Consequently, otherwise possible variation in wavelength of the signal lights $\lambda_1$ to $\lambda_n$ can be prevented with certainty.

Consequently, in such an optical transmission system as the optical transmission system 10 shown in FIG. 2 wherein wavelength multiplexing (WDM) transmission is performed, otherwise possible variation of the branching and insertion characteristic of the light branching and insertion apparatus 4 which is caused by a variation in wavelength of signal light can be prevented to allow transmission and reception of signal light to be performed accurately between the terminal stations 1 to 3.

It is to be noted that such control of the wavelength of signal light as is performed in the present embodiment using the CPU 19' cannot be performed, for example, using such control circuits 32-1 to 32-n as are employed in the modification to the first embodiment described hereinabove with reference to FIGS. 12 and 13.

This is because, if the wavelength of some signal light of signal light combined by the coupler 16 shown in FIGS. 12 and 13 exhibits some variation, then if the variation in wavelength is very small, then most of the signal light whose wavelength exhibits the variation is separated by the separator 30, but as the magnitude of the variation in wavelength increases, the power of the signal light separated decreases.

If the signal light separated in this manner is photoelectrically converted by a corresponding one of the photodiodes 31-1 to 31-n, then since it can be detected that the power of the signal light has decreased, it can be recognized that the wavelength has varied. However, it cannot be recognized in what manner the wavelength has varied. Consequently, it cannot be discriminated in what manner the corresponding one of the laser diodes 11-1 to 11-n should be controlled. Consequently, control in wavelength of signal light cannot be performed.

b3. Third Form of Signal Light Outputting Apparatus (Transmission Apparatus)

Figure 17:
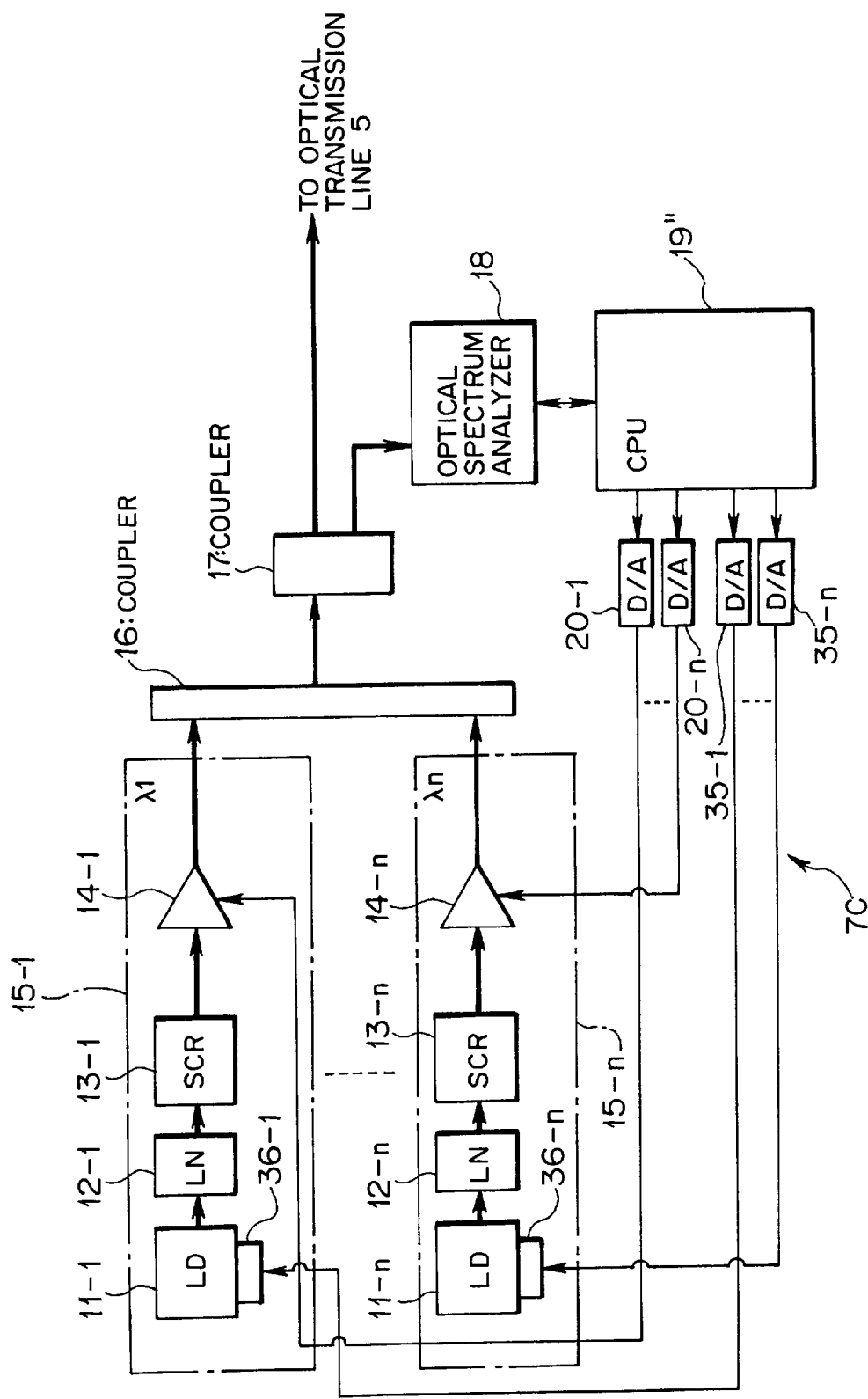
FIG. 17 is a block diagram showing a construction of a signal light outputting apparatus according to a third preferred embodiment of the present invention.

FIG. 17 shows in block diagram a further signal light outputting apparatus to which the present invention is applied. The signal light outputting apparatus 7C shown in FIG. 17 adjusts, when to output a plurality of signal lights $\lambda_1$ to $\lambda_n$ of different wavelengths, the powers and the wavelengths of signal lights $\lambda_1$ to $\lambda_n$ so that they may be equal to respective values set in advance therefor and outputs the signal lights $\lambda_1$ to $\lambda_n$ of the adjusted powers and wavelengths. Thus, the signal light outputting apparatus 7C is used as a transmission apparatus for a plurality of terminal stations which transmit and receive signal light therebetween (in FIG. 2, the A station 1 and the C station 3) as described hereinabove.

Referring to FIG. 17, the signal light outputting apparatus 7C includes signal light outputting units 15-1 to 15-n, a coupler 16, an optical spectrum analyzer 18 and a CPU 19".

The signal light outputting apparatus 7C further includes a 10:1 coupler 17, and digital to analog converters 20-1 to 20-n and 35-1 to 35-n.

It is to be noted that, in FIG. 17, each route along which signal light passes is indicated by a thick line, and a route along which an electric signal passes is indicated by a thin line.

Further, also in the present embodiment, laser diode temperature adjustment members 36-1 to 36-n each formed from a Peltier element are provided for the laser diodes 11-1 to 11-n of the signal light outputting units 15-1 to 15-n, respectively.

In FIG. 17, those elements denoted by like reference characters to those of the signal light outputting apparatus 7 of the first embodiment shown in FIG. 1 and the signal light outputting apparatus 7B of the second embodiment shown in FIG. 14 have like constructs and functions. In the signal light outputting apparatus 7C of the present embodiment, the optical spectrum analyzer 18 functions as a signal light wavelength detection section for detecting, from signal light combined by the coupler 16 and extracted partly by the coupler 17, the powers and wavelengths of the combined signal light for wavelengths corresponding to the signal light wavelengths of the laser diodes 11-1 to 11-n of the signal light outputting units 15-1 to 15-n.

The CPU 19" controls operation of the optical spectrum analyzer 18 and functions as a signal light output controller for controlling, in order to control the powers and the wavelengths of the signal lights $\lambda_1$ to $\lambda_n$ of the combined signal light, the signal light outputs of the corresponding post-amplifiers 14-1 to 14-n in response to the powers and the wavelengths of the signal lights $\lambda_1$ to $\lambda_n$ detected by the optical spectrum analyzer 18. The CPU 19" functions also as a signal light wavelength controller for controlling the signal light wavelengths of the corresponding laser diodes 11-1 to 11-n.

Control of the wavelengths of the output signal lights of the corresponding laser diodes 11-1 to 11-n then is performed by controlling the temperatures of the laser diode temperature adjustment members 36-1 to 36-n provided for the corresponding laser diodes 11-1 to 11-n.

Figure 18:
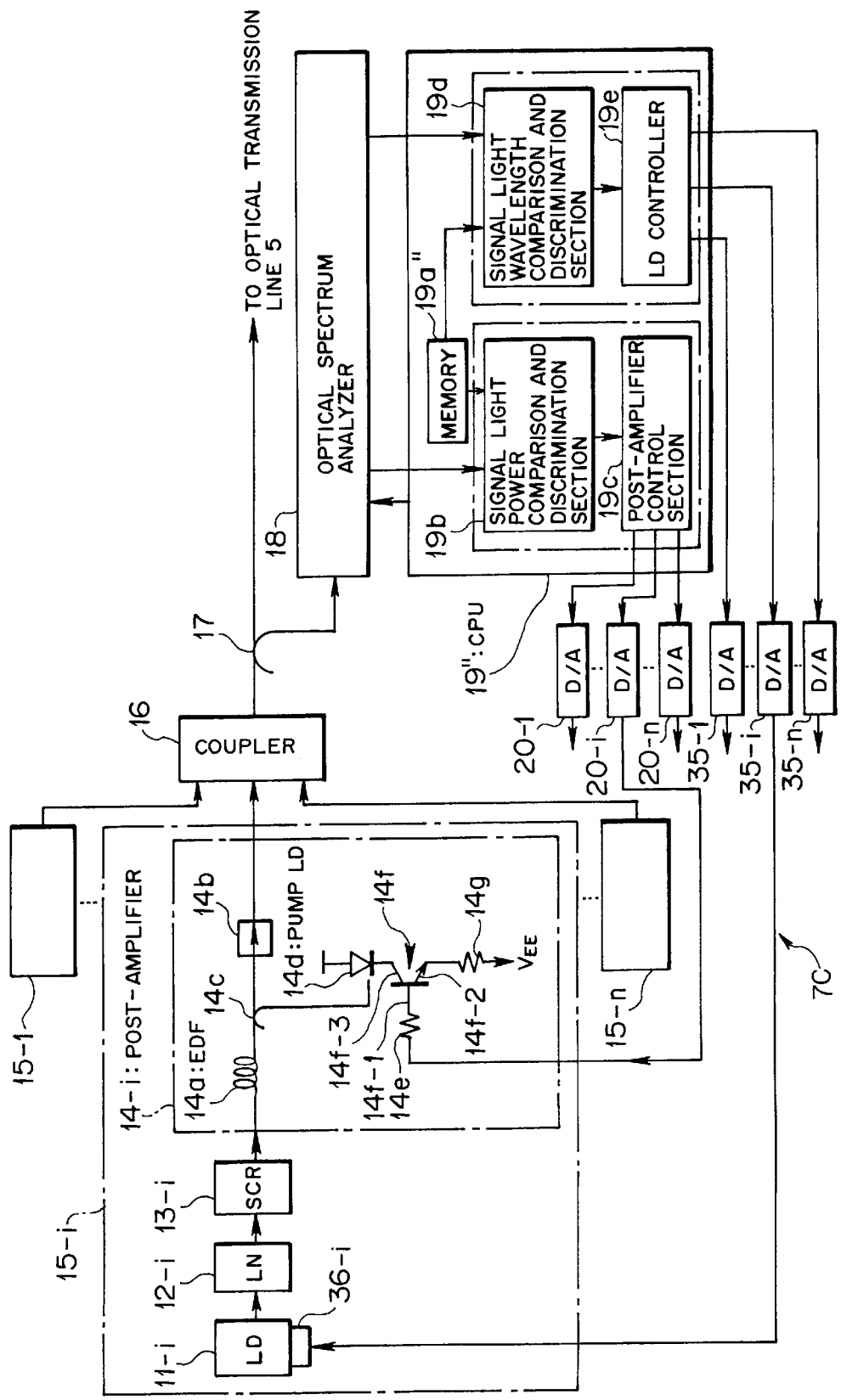
FIGS. 18 and 19 are block diagrams showing details of the construction of part of the signal light outputting apparatus of FIG. 17.
Figure 19:
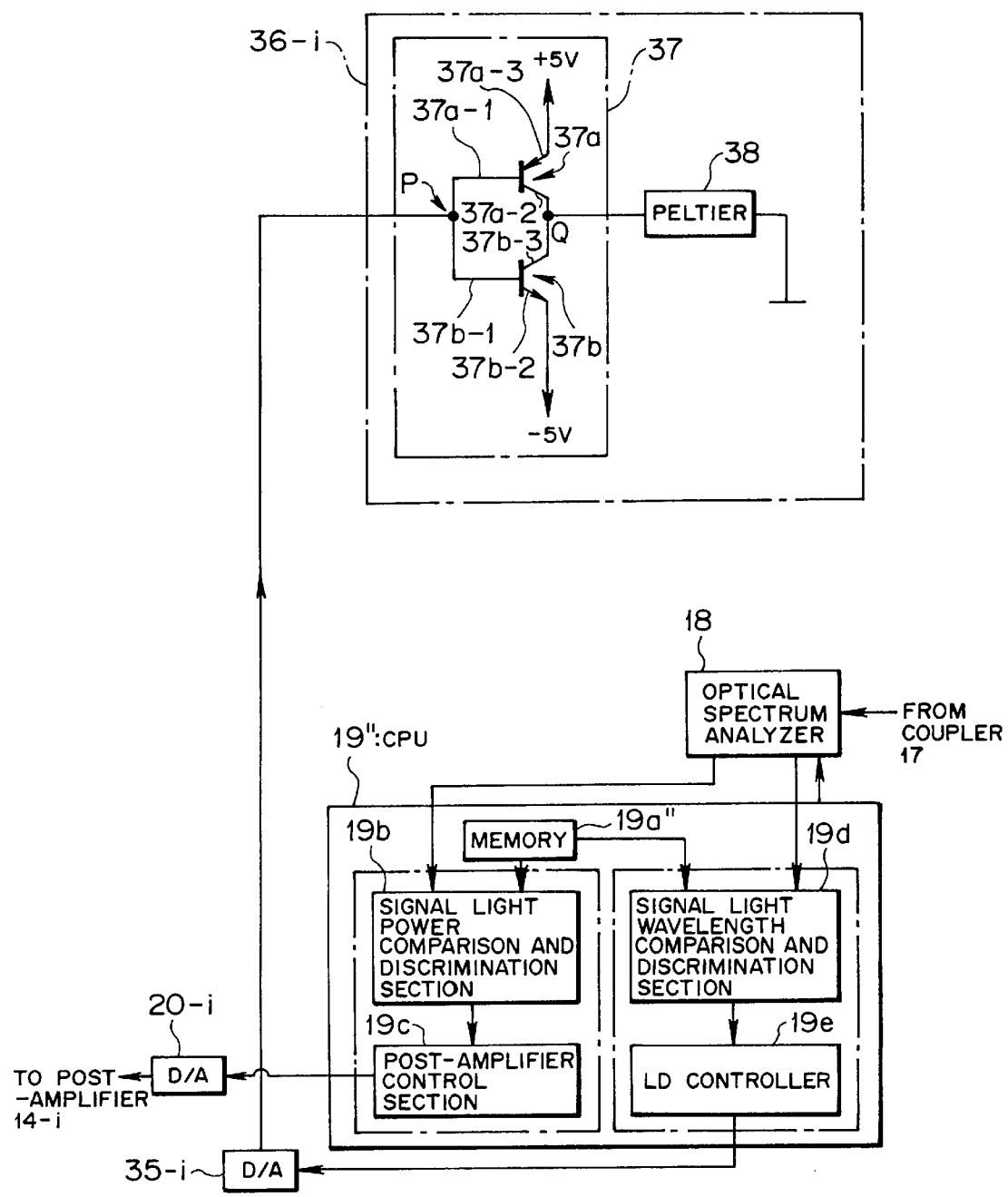

In order to realize the function as the signal light wavelength controller, the CPU 19" includes, as shown in FIGS. 18 and 19, a memory 19a" for storing values of the powers and wavelengths of the signal lights $\lambda_1$ to $\lambda_n$, that is, initially set values for the powers and the wavelengths of the signal lights $\lambda_1$ to $\lambda_n$, and realizes the functions corresponding to a signal light power comparison and discrimination section 19b, a post-amplification control section 19c, a signal light wavelength comparison and discrimination section 19d and a laser diode controller 19e by processing of software.

When detection data of the signal lights $\lambda_1$ to $\lambda_n$ are inputted from the optical spectrum analyzer 18, the signal light power comparison and discrimination section 19b reads out the initially set values of the the powers of the signal lights corresponding to the inputted signal lights $\lambda_1$ to $\lambda_n$ from the memory 19a", and compares the powers of the signal lights $\lambda_1$ to $\lambda_n$ detected by the optical spectrum analyzer 18 with the powers of the signal lights $\lambda_1$ to $\lambda_n$ set by the pre-emphasis described hereinabove to discriminate whether or not the values of the powers of the signal lights $\lambda_1$ to $\lambda_n$ detected by the optical spectrum analyzer 18 are equal to the values set by the pre-emphasis.

The post-amplification control section 19c outputs output control signals for controlling the signal light outputs of the post-amplifiers 14-1 to 14-n in response to results of the comparison and discrimination by the signal light power comparison and discrimination section 19b.

It is to be noted that the output control signals outputted from the post-amplification control section 19c are converted from digital signals into analog signals by the digital to analog converters 20-1 to 20-n and then inputted to the post-amplifiers 14-1 to 14-n.

Further, when the detection data of the signal lights $\lambda_1$ to $\lambda_n$ are inputted from the optical spectrum analyzer 18, the signal light wavelength comparison and discrimination section 19d reads out the initially set values of the the wavelengths of the signal lights corresponding to the inputted signal lights $\lambda_1$ to $\lambda_n$ from the memory 19a", and compares the wavelengths of the signal lights $\lambda_1$ to $\lambda_n$ detected by the optical spectrum analyzer 18 with the wavelengths of the signal lights $\lambda_1$ to $\lambda_n$ set in advance to discriminate whether or not the values of the wavelengths of the signal lights $\lambda_1$ to $\lambda_n$ detected by the optical spectrum analyzer 18 are equal to the values set in advance.

The laser diode controller 19e outputs, in response to a result of the comparison and discrimination by the signal light wavelength comparison and discrimination section 19d, wavelength control signals for controlling the corresponding signal light wavelengths of the laser diodes 11-1 to 11-n.

It is to be noted that the wavelength control signals outputted from the laser diode controller 19e are converted from digital signals into analog signals of voltages corresponding to displacements between the wavelengths of the signal lights $\lambda_1$ to $\lambda_n$ detected by the optical spectrum analyzer 18 and the wavelengths of the signal lights $\lambda_1$ to $\lambda_n$ set in advance by the digital to analog converters 35-1 to 35-n, respectively. In this instance, for example, if a detected wavelength is longer than a corresponding preset value, then it is converted into a positive voltage, but if it is shorter than the corresponding preset value, then it is converted into a negative voltage. The voltages thus obtained are inputted to the laser diode temperature adjustment members 36-1 to 36-n.

It is to be noted that FIG. 18 shows a signal light outputting unit 15-i (i=1, . . . , n), a digital to analog converter 20-i (i=1, . . . , n) and a digital to analog converter 35-i (i=1, . . . , n), and FIG. 19 shows a laser diode temperature adjustment member 36-i (i=1, . . . n), a digital to analog converter 20-i (i=1, . . . , n) and a digital to analog converter 35-i (i=1, . . . , n).

In the signal light outputting apparatus 7C of the present embodiment having the construction described above, when signal lights $\lambda_1$ to $\lambda_n$ of different wavelengths are outputted from the signal light outputting units 15-1 to 15-n, respectively, the plurality of signal lights $\lambda_1$ to $\lambda_n$ thus outputted are combined by the coupler 16 and outputted to an optical transmission line 5.

Meanwhile, part of the signal light combined by the coupler 16 is inputted via the coupler 17 to the optical spectrum analyzer 18, by which the powers and the wavelengths of the signal lights $\lambda_1$ to $\lambda_n$ of the combined signal light are detected from the inputted signal light. The CPU 19" controls, in order to control the powers of the corresponding signal lights $\lambda_1$ to $\lambda_n$ of the combined signal light, the signal light outputs of the post-amplifiers 14-1 to 14-n in response to the powers of the signal lights $\lambda_1$ to $\lambda_n$ detected by the optical spectrum analyzer 18. It is to be noted that the optical spectrum analyzer 18 and the CPU 19" operate, for example, in such a manner as described hereinabove with reference to the flow chart of FIG. 5.

Further, the CPU 19" controls, in order to control the wavelengths of the signal lights $\lambda_1$ to $\lambda_n$ of the combined signal light, the temperatures of the corresponding laser diode temperature adjustment members 36-1 to 36-n in response to the wavelengths of the signal lights $\lambda_1$ to $\lambda_n$ detected by the optical spectrum analyzer 18 thereby to control the signal light outputs from the laser diodes 11-1 to 11-n. It is to be noted that the optical spectrum analyzer 18 and the CPU 19" then operate, for example, in such a manner as described hereinabove with reference to the flow chart of FIG. 16.

It is to be noted that the control of the powers of the signal lights $\lambda_1$ to $\lambda_n$ and the control of the wavelengths of the signal lights $\lambda_1$ to $\lambda_n$ described above may be performed simultaneously with each other, or the control of the wavelengths (or powers) of the signal lights $\lambda_1$ to $\lambda_n$ may be performed after the control of the powers (or wavelengths) of the signal lights $\lambda_1$ to $\lambda_n$ is performed.

In this manner, in the signal light outputting apparatus 7C of the present embodiment, when a plurality of signal lights $\lambda_1$ to $\lambda_n$ of different wavelengths are combined and outputted, part of signal light obtained by the combination of the signal lights $\lambda_1$ to $\lambda_n$ is branched and extracted at an input end to an optical transmission line 5, and the powers and the wavelengths of the signal lights $\lambda_1$ to $\lambda_n$ are monitored by the optical spectrum analyzer 18. Then, while supervising whether or not the values of the powers and the wavelengths of the signal lights $\lambda_1$ to $\lambda_n$ are equal to respective initially set values, the CPU 19" controls the signal light outputs of the laser diodes 11-1 to 11-n so that the values of the wavelengths of the signal lights $\lambda_1$ to $\lambda_n$ may always be equal to the respective initially set values. Consequently, otherwise possible variation in wavelength of the signal lights $\lambda_1$ to $\lambda_n$ can be prevented while controlling the ratios of the powers of the signal lights $\lambda_1$ to $\lambda_n$ set by the pre-emphasis with certainty.

In this instance, since the powers of the signal lights $\lambda_1$ to $\lambda_n$ are controlled by controlling the signal light outputs of the post-amplifiers 14-1 to 14-n, otherwise possible variation in wavelength of signal light which arises when the output of a signal light source (laser diode) is controlled in such an apparatus as the ordinary signal light outputting apparatus described hereinabove can be prevented, and control of the wavelengths of the signal lights $\lambda_1$ to $\lambda_n$ described above can be achieved readily.

Consequently, in such an optical transmission system as the optical transmission system 10 shown in FIG. 2 wherein wavelength multiplexing (WDM) transmission is performed, pre-emphasis of the signal light outputting apparatus 7 when signal light is outputted can be stabilized over a long period of time to suppress an otherwise possible dispersion in branching and insertion characteristic between different signal lights to a minimum level. Further, otherwise possible variation in branching and insertion characteristic of the light branching and insertion apparatus 4 which is caused by variation in wavelength of signal light can be prevented to allow transmission and reception of signal light to be performed accurately between the terminal stations 1 to 3.

b4. Others

It is to be noted that, while, in the signal light outputting apparatus 7A shown in FIGS. 12 and 13 which is a modification to the signal light outputting apparatus 7 of the first embodiment, control of the powers of the signal lights $\lambda_1$ to $\lambda_n$ is performed by the control circuits 32-1 to 32-n, analog to digital converters which are controlled by a CPU may alternatively be provided in a stage following the photo-diodes 31-1 to 31-n.

c. Light Branching and Insertion Apparatus

Here, the light branching and insertion apparatus 4 employed in the optical transmission system 10 shown in FIG. 2 will be described.

The light branching and insertion apparatus 4 is provided at the branching points of the optical transmission lines 5 which connect the plurality of terminal stations 1 to 3 as described hereinabove and outputs signal light of a desired wavelength inputted from any of the terminal stations 1 to 3 to another desired one of the terminal stations 1 to 3 to allow transmission of the signal light between the desired ones of the terminal stations. Referring to FIG. 6, the light branching and insertion apparatus 4 includes a branching element 21-1 and an insertion element 21-2.

When signal light is inputted from an input side optical fiber 22-1, the branching element 21-1 outputs a signal light of a desired wavelength from within the inputted signal light to the insertion element 21-2 via another optical fiber 22-3, but outputs signal lights of the other wavelengths than the desired wavelength from within the inputted signal light to a branching output side optical fiber 22-4.

Figure 7A:
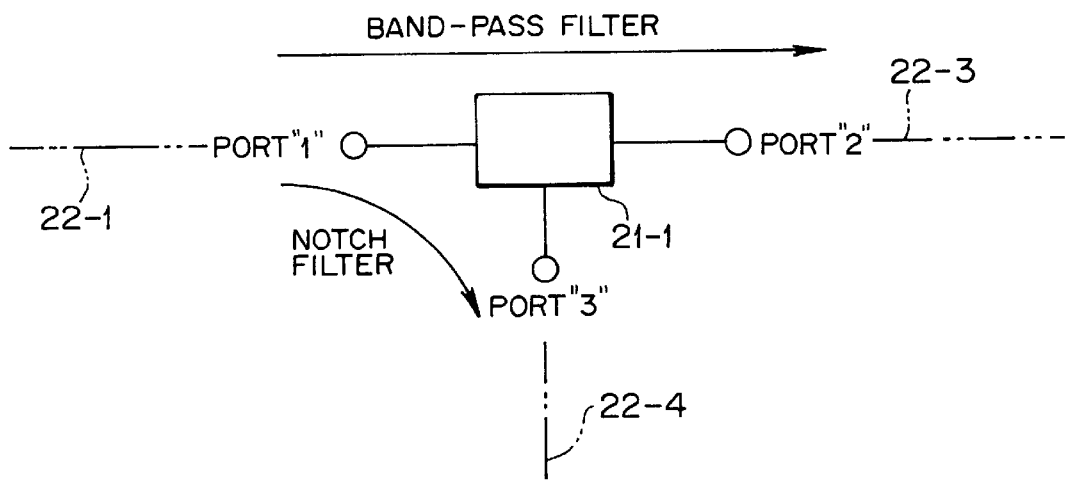
FIGS. 7(*a*) and 7(*b*) are diagrammatic views illustrating operations of dielectric multilayer film filters employed in the light branching and insertion apparatus of FIG. 6.

In particular, the branching element 21-1 is formed from a dielectric multilayer film filter which functions, as seen from FIG. 7(a), for the signal light of the desired wavelength from within the signal light inputted thereto from the input side optical fiber 22-1 through a port 1, a band-pass filter which outputs the signal light of the desired wavelength to the optical fiber 22-3 through another port 2, but functions, for the signal lights of the other wavelengths than the desired wavelength from within the signal light inputted thereto from the input side optical fiber 22-1 through the port 1, as a band block filter (notch filter) which outputs the signal lights of the other wavelengths to the branching output side optical fiber 22-4 through a further port 3.

Meanwhile, the insertion element 21-2 combines signal light inputted thereto from a branching input side optical fiber 22-5 with signal light inputted thereto from the branching element 21-1 via the optical fiber 22-3 and outputs the thus combined signal light to an output side optical fiber 22-2.

Figure 7B:
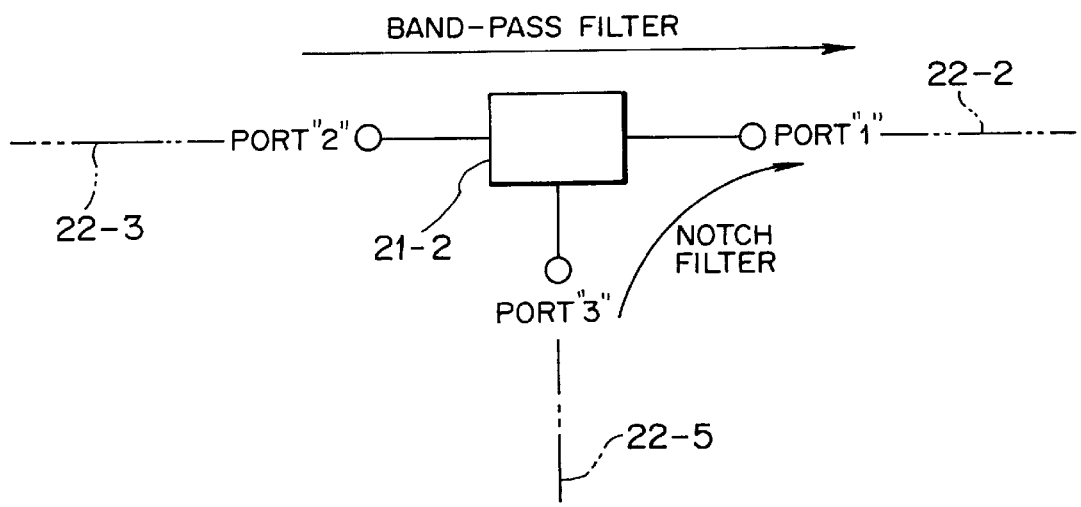

In particular, the insertion element 21-2 is formed from a dielectric multilayer film filter which functions, as seen from FIG. 7(b), for the signal light inputted thereto from the optical fiber 22-3 through the port 2, a band-pass filter which outputs the signal light to the output side optical fiber 22-2 through the port 1, but functions, for the signal light inputted thereto from the branching input side optical fiber 22-5 through the port 3, as a band block filter (notch filter) which outputs the signal light to the output side optical fiber 22-2 through the port 1.

Thus, the insertion element 21-2 functions as an optical coupler which combines signal light inputted thereto from the port 2 and signal light inputted thereto from the port 3 with each other and outputs the combined signal light to the port 1.

It is to be noted that, since the dielectric multilayer film filters shown in FIGS. 7(a) and 7(b) individually have reversible characteristics, the branching element 21-1 and the insertion element 21-2 can be formed from dielectric multilayer filters of a same type.

Since the light branching and insertion apparatus 4 is formed using a dielectric multilayer film filter in this manner, it can branch a plurality of signal lights of different wavelengths transmitted by a single optical fiber depending upon the wavelength or insert a signal light of a desired wavelength into a plurality of signal lights of different wavelengths transmitted by a single optical fiber.

Consequently, while, for example, in the ordinary light branching and inserting apparatus 105 and 106 shown in FIG. 20, the optical transmission lines 107 are constructed such that they overlap with each other between different terminal stations, with the light branching and insertion apparatus 4 shown in FIG. 6, the optical transmission lines 5 can be formed simply without causing them overlapping with each other as seen in FIG. 2.

Here, the dielectric multilayer film filters described hereinabove will be described in more detail.

Figure 10:
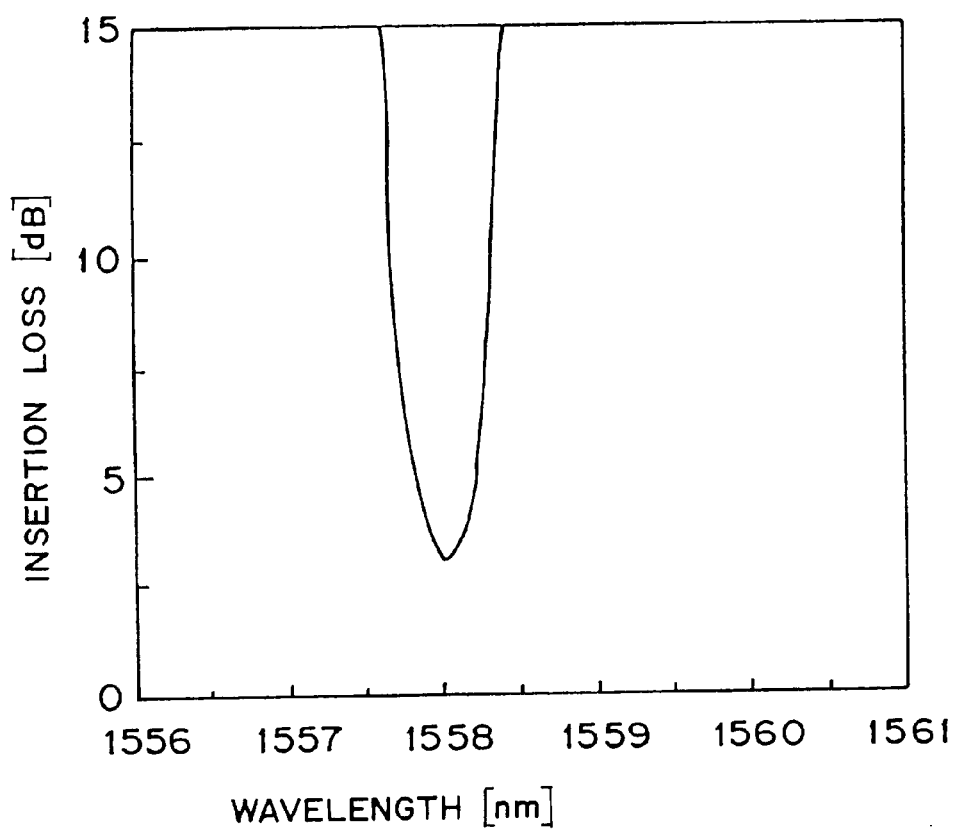
FIG. 10 is a diagram illustrating a wavelength characteristic of the dielectric multilayer film filters employed in the light branching and insertion apparatus of FIG. 6.
Figure 11:
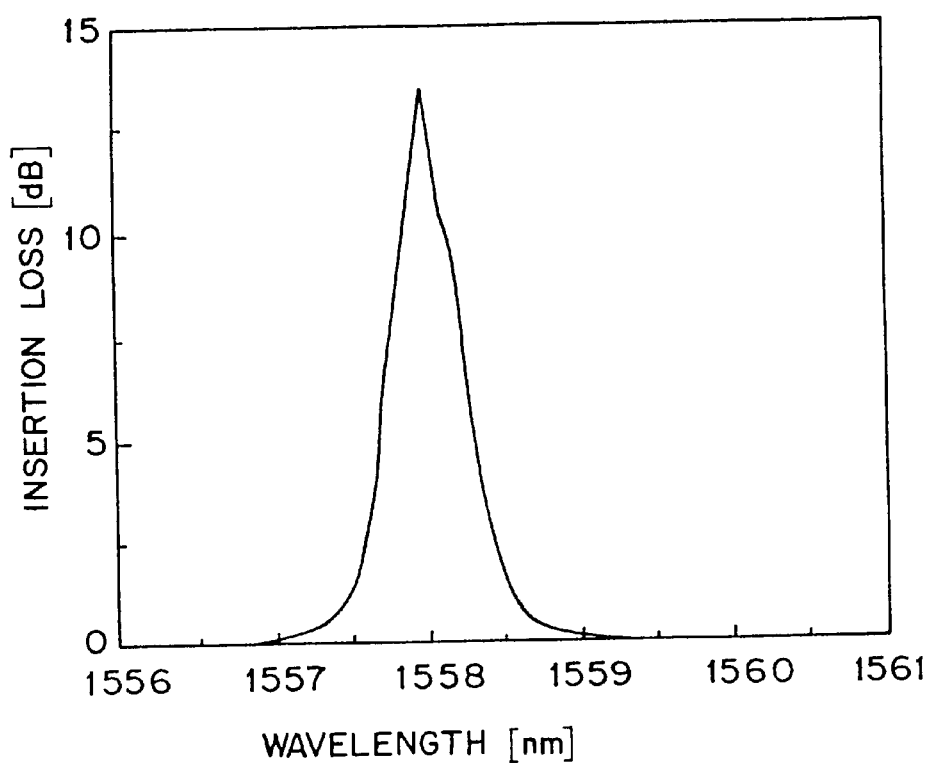
FIG. 11 is a diagram illustrating another wavelength characteristic of the dielectric multilayer film filters employed in the light branching and insertion apparatus of FIG. 6.

Each of the dielectric multilayer film filters is formed as such a 3-port type optical filter as shown in FIG. 7(a) or 7(b). The dielectric multilayer film filter shown in FIG. 7(a) has, between the port 1 and the port 2 thereof, such a wavelength characteristic of a band-pass filter having a center wavelength of 1,558 nm as shown in FIG. 10, but has, between the port 1 and the port 3 thereof, a wavelength characteristic of a band block filter having a center wavelength of 1,558 nm as shown in FIG. 11. It is to be noted that each of FIGS. 10 and 11 illustrates a relationship between the wavelength of signal light and the insertion loss of signal light at the wavelength.

If signal light is inputted from the port 1 to the dielectric multilayer film filter described above, then the signal light of the wavelength of 1,558 nm is outputted to the port 2 while the signal lights of the other wavelengths than 1,558 nm are outputted to the port 3. Consequently, branching of the signal lights is performed depending upon the wavelength. It is to be noted that the dielectric multilayer film filter also effects insertion of signal light similarly.

While such branching and insertion of signal light can be performed also by means of an optical coupler, since the optical coupler exhibits a high loss when it effects branching and insertion of signal light, if a light branching and insertion apparatus is constructed using this optical coupler, then also the loss of signal light transmitted via the light branching and insertion apparatus exhibits a high loss.

Therefore, the light branching and insertion apparatus 4 is formed using dielectric multilayer film filters which exhibit a loss of signal light lower than optical couplers so that the loss of signal light transmitted via the light branching and insertion apparatus 4 may be low.

Figure 9:
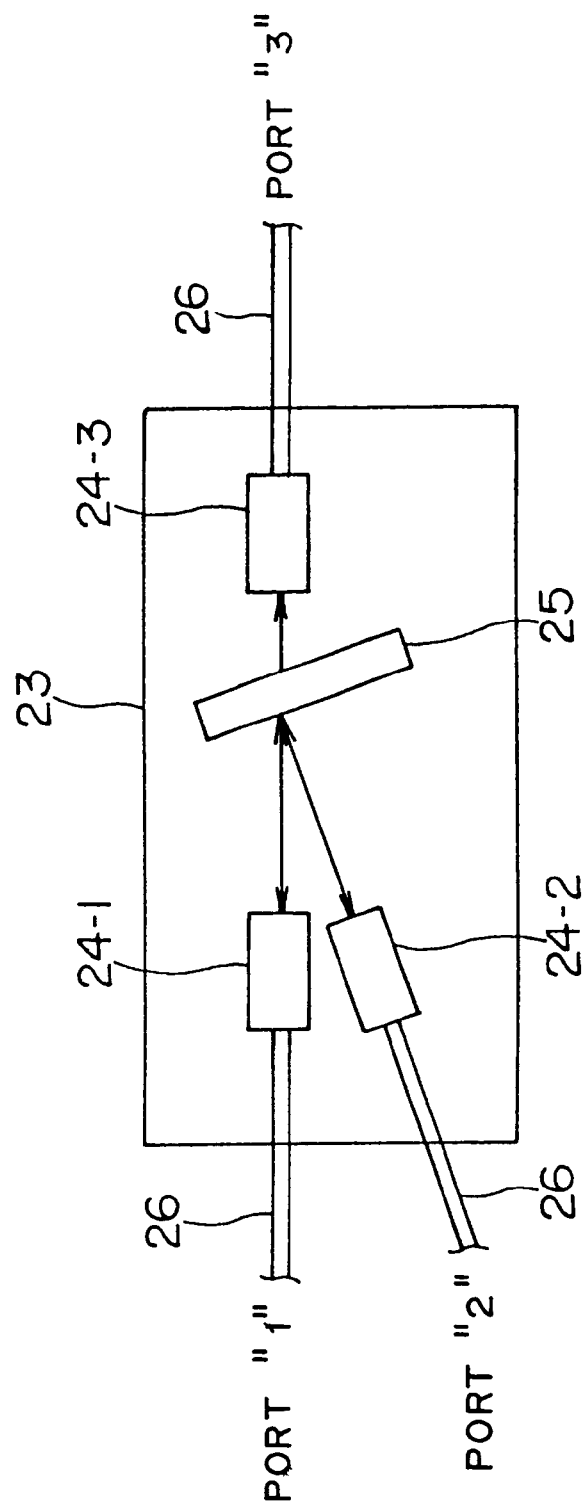
FIG. 9 is a block diagram showing a construction of the dielectric multilayer film filter employed in the light branching and insertion apparatus of FIG. 6.

More particularly, referring to FIG. 9, each of the dielectric multilayer film filters is composed of lenses 24-1 to 24-3 and a dielectric multilayer film 25. It is to be noted that reference numeral 26 denotes an optical fiber.

The lenses 24-1 to 24-3 are collimate lenses individually attached to the optical fibers 26 in order to assure high convergency of signal light. The dielectric multilayer film 25 actually has a function as a band-pass filter which passes signal light therethrough or another function as a band block filter which reflects signal light depending upon the wavelength of signal light inputted thereto.

Where the dielectric multilayer film filter 23 having the construction described above is used for the blanching element 21-1, signal light is inputted through the port 1, and the branched signal light is outputted through the port 3 while the signal lights other than the branched signal light are outputted through the port 2.

On the other hand, where the dielectric multilayer film filter 23 is used for the insertion element 21-2, signal light is inputted through the port 2 and signal light to be inserted is inputted through the port 3, and the combined signal light of the inputted signal light and the signal light to be inserted is outputted through the port 1.

Signal light branching and insertion operations in this instance will be described with reference to FIG. 8.

Figure 8:
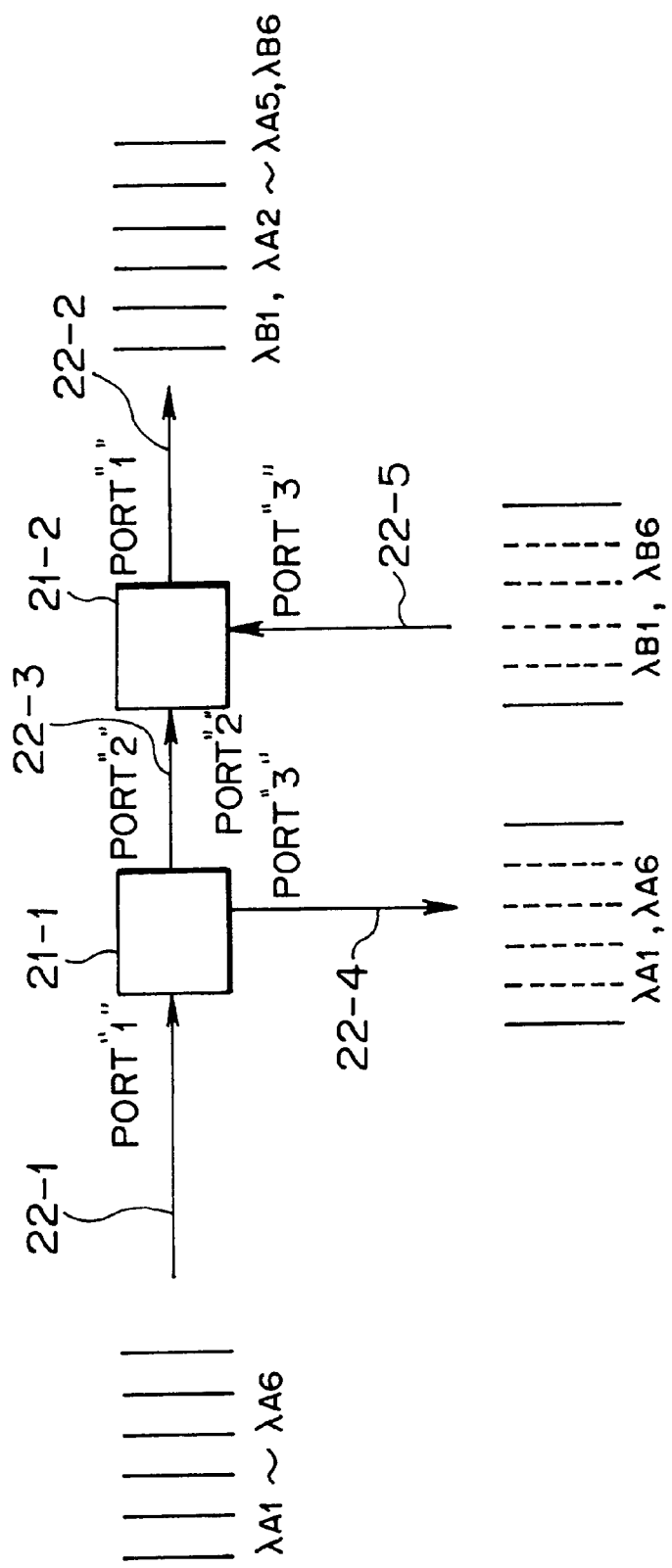
FIG. 8 is a diagrammatic view illustrating the operations of the dielectric multilayer film filters employed in the light branching and insertion apparatus of FIG. 6.

As seen in FIG. 8, for example, if signal lights $\lambda_{A2}$ to $\lambda_{A6}$ are inputted from the input side optical fiber 22-1 to the port 1 of the branching element 21-1, then the branching element 21-1 outputs the signal lights $\lambda_{A2}$ to $\lambda_{A5}$ from the port 2 thereof to the optical fiber 22-3, but branches the signal lights $\lambda_{A1}$ and to $\lambda_{A6}$ and outputs them from the port 3 thereof to the branching output side optical fiber 22-4.

Then, when the signal lights $\lambda_{A2}$ to $\lambda_{A5}$ are inputted from the optical fiber 22-3 to the port 2 of the insertion element 21-2 and signal lights $\lambda_{B1}$ and $\lambda_{B6}$ to be inserted are inputted from the branching input side optical fiber 22-5 to the port 3 of the insertion element 21-2, the insertion element 21-2 combines the signal lights $\lambda_{A2}$ to $\lambda_{A5}$ and the signal lights $\lambda_{B1}$ and $\lambda_{B6}$ with each other and outputs them from the port 1 thereof to the output side optical fiber 22-2.

Branching and insertion of signal light by the dielectric multilayer film filter 23 are performed in this manner.

In the light branching and insertion apparatus 4 shown in FIG. 6 which has the construction described above, if signal light is inputted from the input side optical fiber 22-1, then the light branching and insertion apparatus 4 outputs a signal light of a desired wavelength from within the inputted signal light to the output side optical fiber 22-2 via the optical fiber 22-3 and the insertion element 21-2, but outputs signal lights of the other wavelengths than the desired wavelength from within the inputted signal light to the branching output side optical fiber 22-4.

Meanwhile, the light branching and insertion apparatus 4 outputs signal light inputted thereto from the branching input side optical fiber 22-5 to the output side optical fiber 22-2.

In this manner, the light branching and insertion apparatus 4 shown in FIG. 6 can effect branching and insertion of signal light upon transmission of the signal light with a low loss and with a high degree of accuracy while it has a simple construction that it includes the branching element 21-1 and the insertion element 21-2 each formed from a dielectric multilayer film filter.

Further, in the light branching and insertion apparatus 4, since a dielectric multilayer film filter which is an optical filter of the passive type is employed, branching and insertion of signal light can be effect without application of any voltage, and the light branching and insertion apparatus 4 can operate stably also, for example, in an optical transmission system which effects submarine optical communication.

d. Reception Apparatus

In the optical transmission system 10 shown in FIG. 2, the reception apparatus 8 is provided in each of the B station 2 and the C station 3 as described above. The reception apparatus 8 receives signal light transmitted thereto from the transmission apparatus 7 of any other terminal station and demodulates the received signal light.

For the reception apparatus 8, a reception apparatus of the type may be employed which includes, for example, an optical demultiplexing element having a filtering function, and a plurality of signal light reception units for performing demodulation processing for a plurality of signal lights outputted from the optical demultiplexing element.

The present invention is not limited to the specifically described embodiment, and variations and modifications may be made without departing from the scope of the present invention.

What is claimed is:

1. A signal light outputting apparatus, comprising:
   (a) a plurality of signal light outputting units;
   (b) each of said signal light outputting units including (i) a signal light source for outputting signal light of a respective one of different wavelengths, and (ii) an optical amplifier for amplifying the signal light outputted from said signal light source;
   (c) an optical combiner, connected to said signal light outputting units, for combining the signal light of different wavelengths outputted, one from each said signal light outputting units;
   (d) a signal light power detector, connected to said optical combiner, for extracting a part of the signal light of the individual wavelength amplified by the individual optical amplifiers and combined by said optical combiner, and for detecting a power of the individual signal light wavelength corresponding to the individual signal light sources; and (e) a signal light output controller, interconnected between said signal light power detectors and each said signal light outputting unit for controlling, in order to adjust the individual power of the composite amplified signal light, outputs of the corresponding optical amplifiers based on the detected powers of the partial signal light for the individual wavelengths.

2. A signal light outputting apparatus as claimed in claim 1, wherein said signal light output controller includes a signal light power comparison and discrimination section for comparing the powers of the signal lights of the individual wavelengths detected by said signal light power detector with preset powers of signal lights of the individual wavelengths to discriminate whether or not the powers of the signal lights of the individual wavelengths detected by said signal light power detector are equal to the preset powers of the signal lights of the individual wavelengths, and controls the signal light outputs of the corresponding optical amplifiers for amplification of the signal lights of the wavelengths in response to results of the comparison and discrimination by said signal light power comparison and discrimination section.

3. A signal light outputting apparatus as claimed in claim 1, wherein said signal light power detector includes an optical spectrum analyzer.

4. A signal light outputting apparatus as claimed in claim 1, wherein said signal light power detector includes an optical separator for extracting part of the signal light combined by said optical combiner and separating the extracted signal light into signal lights of the individual wavelengths corresponding to the signal light wavelengths of the signal light sources, and a photo-electric converter for converting the signal lights separated by said optical separator into electric signals.

5. A signal light outputting apparatus, comprising:

(a) a plurality of signal light outputting units;

(b) each of said signal light outputting units including (i) a signal light source for outputting signal light of a respective one of different wavelength, (ii) an individual optical amplifier for amplifying the signal light outputted from said signal light source, and (iii) an individual light source temperature adjustment member for adjusting a temperature of said individual light source;

(c) an optical combiner, connected to said signal light outputting units, for combining the individual signal light of different wavelengths outputted, one from each said signal light outputting units;

(d) an optical spectrum analyzer, connected to said optical combiner, for extracting a part of the composite signal light amplified by the individual optical amplifiers and combined by said optical combiner, and for detecting a wavelength of the individual signal light wavelength corresponding to the individual signal light sources; and (e) a signal light wavelength controller, interconnected between said signal light power detector and each said signal light outputting units, for controlling, in order to adjust the wavelengths of the composite amplified signal light, wavelengths of the corresponding signal light sources based on the detected wavelengths of the partial signal light extracted by said optical spectrum analyzer, said signal light wavelength controller being operative to control said light source temperature adjusting member in such a manner that said light source temperature adjusting member adjusts the temperature of the individual light source so as to vary the wavelength of the signal light.

6. A signal light outputting apparatus as claimed in claim 5, wherein said signal light wavelength controller includes a signal light wavelength comparison and discrimination section for comparing the signal light wavelengths of the individual signal light sources extracted by said optical spectrum analyzer with preset signal light wavelengths of the individual signal light sources to discriminate whether or not the signal light wavelengths of the individual signal light sources extracted by said optical spectrum analyzer are equal to the preset signal light wavelengths of the individual signal light sources, and controls the signal light wavelengths of the corresponding signal light sources for outputting of the signal lights of the wavelengths in response to results of the comparison and discrimination by said signal light wavelength comparison and discrimination section.

7. A signal light outputting apparatus as claimed in claim 5, wherein each of the light source temperature adjustment member includes a Peltier element.

8. A signal light outputting apparatus, comprising:

(a) a plurality of signal light outputting units;

(b) each of said signal light outputting units including (i) a signal light source for outputting signal light of a respective one of different wavelength, and (ii) an individual optical amplifier for amplifying the signal light outputted from said signal light source;

(c) an optical combiner, connected to said signal light outputting units, for combining the individual signal light of different wavelengths outputted, one from each said signal light outputting units;

(d) a signal light detector, connected to said optical combiner, for extracting a part of the composite signal light of the individual wavelength amplified by the individual optical amplifiers and combined by said optical combiner, and detecting a power and wavelength of the individual signal light wavelength corresponding to the individual signal signal light sources;

(e) a signal light output controller, interconnected between said signal light power detector and said each signal light outputting unit, for controlling, in order to adjust the individual power of the composite amplified signal light, outputs of the corresponding optical amplifiers based on the detected powers of the partial signal light for the individual wavelengths; and (f) a signal light wavelength controller, interconnected between said signal light detector and said each signal light outputting units, for controlling, in order to adjust the wavelengths of the each of amplified signal light, wavelength of the corresponding signal light sources based on the detected wavelengths of the partial signal light.

9. A signal light outputting apparatus as claimed in claim 8, wherein said signal light output controller includes a signal light power comparison and discrimination section for comparing the powers of the signal lights of the individual wavelengths detected by said signal light detection element with preset powers of signal lights of the individual wavelengths to discriminate whether or not the powers of the signal lights of the individual wavelengths detected by said signal light detection element are equal to the preset powers of the signal lights of the individual wavelengths, and controls the signal light outputs of the corresponding optical amplifiers for amplification of the signal lights of the wavelengths in response to results of the comparison and discrimination by said signal light power comparison and discrimination section, and said signal light wavelength controller includes a signal light wavelength comparison and discrimination section for comparing the signal light wavelengths of the individual signal light sources detected by said signal light detection element with preset signal light wavelengths of the individual signal light sources to discriminate whether or not the signal light wavelengths of the individual signal light sources detected by said signal light detection element are equal to the preset signal light wavelengths of the individual signal light sources, and controls the signal light wavelengths of the corresponding signal light sources for outputting of the signal lights of the wavelengths in response to results of the comparison and discrimination by said signal light wavelength comparison and discrimination section.

10. A signal light outputting apparatus as claimed in claim 8, further comprising a light source temperature adjustment member provided for each of the signal light sources, and wherein said signal light wavelength controller controls the light source temperature adjustment members provided for the individual signal light sources for outputting of the signal lights of the wavelengths to control the signal light wavelengths of the corresponding signal light sources.

11. A signal light outputting apparatus as claimed in claim 10, wherein each of the light source temperature adjustment member includes a Peltier element.

12. A signal light outputting apparatus as claimed in claim 8, wherein said signal light detection element includes an optical spectrum analyzer.

13. An optical transmission system with a signal light outputting apparatus, comprising:
(A) a plurality of signal light outputting apparatus each including
  (a) a plurality of signal light outputting units,
  (b) each of said signal light outputting units having (i) a signal light source for outputting signal light of respective one of different wavelength, (ii) an individual optical amplifier for amplifying the signal light outputted from said signal light source, and (iii) an individual light source temperature adjustment member for adjusting a temperature of said individual light source,
  (c) an optical combiner, connected to said signal light outputting units, for combining the individual signal light of different wavelengths outputted, one from each said signal light outputting units,
  (d) an optical spectrum analyzer, connected to said optical combiner, for extracting a part of the composite signal light amplified by the individual optical amplifiers and combined by said optical combiner, and for detecting a wavelength of the individual signal light wavelength corresponding to the individual signal light sources, and
  (e) a signal light wavelength controller, interconnected between said optical spectrum analyzer and said each signal light outputting units, for controlling, in order to adjust the individual wavelengths of the composite amplified signal light, wavelengths of the corresponding signal light sources based on the detected wavelengths of the partial signal light extracted by said optical spectrum analyzer,
  said signal light wavelength controller being operative to control said light source temperature adjusting member in such a manner that said light source temperature adjusting member adjusts the temperature of the individual light source so as to vary the wavelength of the signal light;
(B) an optical fiber system interconnected with said plurality of signal light outputting apparatus; and
(C) a light branching and/or insertion apparatus provided at a branching point of said optical fiber system by which said plurality of signal light outputting apparatus are interconnected, said light branching and/or insertion apparatus including a branching element for outputting a signal light of a selected wavelength from within the signal light inputted from an input side optical fiber to said light branching and/or insertion apparatus to an output side optical fiber and outputting signal lights of wavelengths other than the selected wavelength from within the signal light inputted from said input side optical fiber to said light branching and/or insertion apparatus to a branching output side optical fiber, and an insertion element for outputting signal light inputted thereto from a branching input side optical fiber to an output side optical fiber;
whereby signal light is communicated between said plurality of signal light outputting apparatus via said light branching and/or insertion apparatus.

14. An optical transmission system with a signal light outputting apparatus, comprising:
(A) a plurality of signal light outputting apparatuses, each including
  (a) a plurality of signal light outputting units,
  each of said signal light outputting units having (i) a signal light source for outputting signal light of respective one of different wavelength, and (ii) an individual optical amplifier for amplifying the signal light outputted from said signal light source,
  (b) an optical combiner, connected to said signal light outputting units, for combining the individual signal light of different wavelengths outputted, one from each said signal light outputting units,
  (c) a signal light detector, connected to said optical combiner, for extracting a part of the composite signal light of the individual wavelength amplified by the individual optical amplifiers and combined by said optical combiner, and detecting a power and wavelength of the individual signal light wavelength corresponding to the individual signal light sources,
  (d) a signal light output controller, interconnected between said signal light power detectors and said each signal light outputting unit, for controlling, in order to adjust the individual power of the composite amplified signal light, outputs of the corresponding optical amplifiers based on the detected powers of the partial signal light for the individual wavelengths, and
  (e) a signal light wavelength controller, interconnected between said signal light power detector and said each signal light outputting units, for controlling, in order to adjust the wavelengths of the composite each of amplified signal light, the individual wavelength of the corresponding signal light sources based on the detected wavelengths of the partial signal light for the individual wavelengths;
(B) an optical fiber system adapted to be interconnected with said plurality of signal light outputting apparatuses; and
(C) a light branching and/or insertion apparatus provided at a branching point of said optical fiber system by which said plurality of signal light outputting apparatus are interconnected, said light branching and/or insertion apparatus including a branching element for outputting a signal light of a selected wavelength from within the signal light inputted from an input side optical fiber to said light branching and/or insertion apparatus to an output side optical fiber and outputting signal lights of wavelengths other than the selected wavelength from within the signal light inputted from said input side optical fiber to said light branching and/or insertion apparatus to a branching output side optical fiber, and an insertion element for outputting signal light inputted thereto from a branching input side optical fiber to an output side optical fiber;

signal light being communicated between said plurality of signal light outputting apparatus via said light branching and/or insertion apparatus.

15. An optical transmission system with a signal light outputting apparatus, comprising:

(A) a plurality of signal light outputting apparatuses each including (a) a plurality of signal light outputting units,
each of said signal light outputting units having (i) a signal light source for outputting signal light of respective one of different wavelength, and (ii) an individual optical amplifier for amplifying the signal light outputted from said signal light source, (b) an optical combiner, connected to said signal light outputting units, for combining the individual signal light of different wavelengths outputted, one from each said signal light outputting units, (c) a signal light power detector, connected to said optical combiner, for extracting a part of the composite signal light of the individual wavelength amplified by the individual optical amplifiers and combined by said optical combiner, and for detecting a power of the individual signal light wavelength corresponding to the individual signal light sources, and (d) a signal light output controller, interconnected between said signal light power detector and said each signal light outputting unit, for controlling, in order to adjust the individual power of the composite amplified signal light, outputs of the corresponding optical amplifiers based on the detected powers of the partial signal light for the individual wavelengths;

(B) an optical fiber system, interconnected with said plurality of signal light outputting apparatus; and (C) a light branching and/or insertion apparatus provided at a branching point of said optical fiber system by which said plurality of signal light outputting apparatus are interconnected, said light branching and/or insertion apparatus including a branching element for outputting a signal light of a selected wavelength from within the signal light inputted from an input side optical fiber to said light branching and/or insertion apparatus to an output side optical fiber and outputting signal lights of wavelengths other than the selected wavelength from within the signal light inputted from said input side optical fiber to said light branching and/or insertion apparatus to a branching output side optical fiber, and an insertion element to output signal light inputted thereto from a branching input side optical fiber to an output side optical fiber, whereby signal light is communicated between said plurality of signal light outputting apparatus via light branching and/or insertion apparatus.

* * * * *

UNITED STATES PATENT AND TRADEMARK OFFICE
CERTIFICATE OF CORRECTION

PATENT NO. : 6,204,945 B1
DATED : March 20, 2001
INVENTOR(S) : Hiroyuki Iwata, et al.

It is certified that error appears in the above-identified patent and that said Letters Patent is hereby corrected as shown below:

<u>Column 30,</u>
Line 43, delete the second occurrence of "signal".

Signed and Sealed this

Twenty-seventh Day of November, 2001

*Attest:*

NICHOLAS P. GODICI
*Attesting Officer*     *Acting Director of the United States Patent and Trademark Office*